US007788407B1

(12) United States Patent
Venkat et al.

(10) Patent No.: US 7,788,407 B1
(45) Date of Patent: Aug. 31, 2010

(54) APPARATUS AND METHODS FOR PROVIDING AN APPLICATION LEVEL GATEWAY FOR USE IN NETWORKS

(75) Inventors: Balaji Venkat, Tamilnadu (IN); Kaushik Narayan, Tamilnadu (IN); Manokar Namasivayan, Tamilnadu (IN); Shankar Sthanuretnam, Tamil Nadu (IN)

(73) Assignee: Cisco Technology, Inc., San Jose, CA (US)

( * ) Notice: Subject to any disclaimer, the term of this patent is extended or adjusted under 35 U.S.C. 154(b) by 1586 days.

(21) Appl. No.: 10/914,444

(22) Filed: Aug. 9, 2004

(51) Int. Cl.
*G06F 15/16* (2006.01)
*G06F 15/173* (2006.01)

(52) U.S. Cl. ................ 709/245; 709/246; 709/238; 709/227

(58) Field of Classification Search ......... 709/245–246, 709/238, 227
See application file for complete search history.

(56) References Cited

U.S. PATENT DOCUMENTS

| | | | | |
|---|---|---|---|---|
| 5,774,660 | A | 6/1998 | Brendel et al. | 709/201 |
| 5,887,170 | A * | 3/1999 | Ansberry et al. | 709/204 |
| 6,006,258 | A | 12/1999 | Kalajan | 709/219 |
| 6,128,644 | A | 10/2000 | Nozaki | 709/203 |
| 6,157,950 | A | 12/2000 | Krishnan | 709/223 |
| 6,182,139 | B1 | 1/2001 | Brendel | 709/226 |
| 6,289,382 | B1 | 9/2001 | Bowman-Amuah | 709/226 |
| 6,295,551 | B1 | 9/2001 | Roberts et al. | 709/205 |
| 6,324,582 | B1 * | 11/2001 | Sridhar et al. | 709/230 |
| 6,332,163 | B1 | 12/2001 | Bowman-Amuah | 709/231 |
| 6,389,462 | B1 | 5/2002 | Cohen et al. | 709/218 |
| 6,438,594 | B1 | 8/2002 | Bowman-Amuah | 709/225 |
| 6,505,254 | B1 | 1/2003 | Johnson et al. | 709/239 |
| 6,601,098 | B1 * | 7/2003 | Case et al. | 709/224 |
| 6,628,617 | B1 * | 9/2003 | Karol et al. | 370/237 |
| 6,721,777 | B1 * | 4/2004 | Sharma | 718/101 |
| 6,832,239 | B1 * | 12/2004 | Kraft et al. | 709/203 |
| 6,865,605 | B1 * | 3/2005 | Soderberg et al. | 709/226 |
| 2001/0047421 | A1 * | 11/2001 | Sridhar et al. | 709/230 |

OTHER PUBLICATIONS

U.S. Appl. No. 09/693,732, filed Oct. 21, 2000, Venkat et al.

* cited by examiner

*Primary Examiner*—Vivek Srivastava
*Assistant Examiner*—Thomas Duong
(74) *Attorney, Agent, or Firm*—Brinks Hofer Gilson & Lione

(57) ABSTRACT

An application level gateway allows computers on a local area or "internal" network to serve data (e.g., web pages, files or other constructs) to computer systems on an external or public network such as the Internet, even though references such as hostnames and/or network addresses within the internal network that are contained within the data (e.g., URLs in web pages) might not be compatible (e.g., DNS resolvable or routable) with the external network. The system detects, in a portion of data (e.g., a web page), a local reference to a computer system on the internal network, determines whether a computer system identifier is mapped to the computer system specified in the local reference, and replaces the local reference with a translated reference obtained from the mapping. The translated reference contains the computer system identifier and a reference to a gateway computer system coupled to the internal network, such that subsequent referrals to the translated reference are directed to the gateway computer system. When a request for the data is subsequently received, the gateway performs a reverse mapping to determine the identity of the computer system on the internal network.

30 Claims, 5 Drawing Sheets

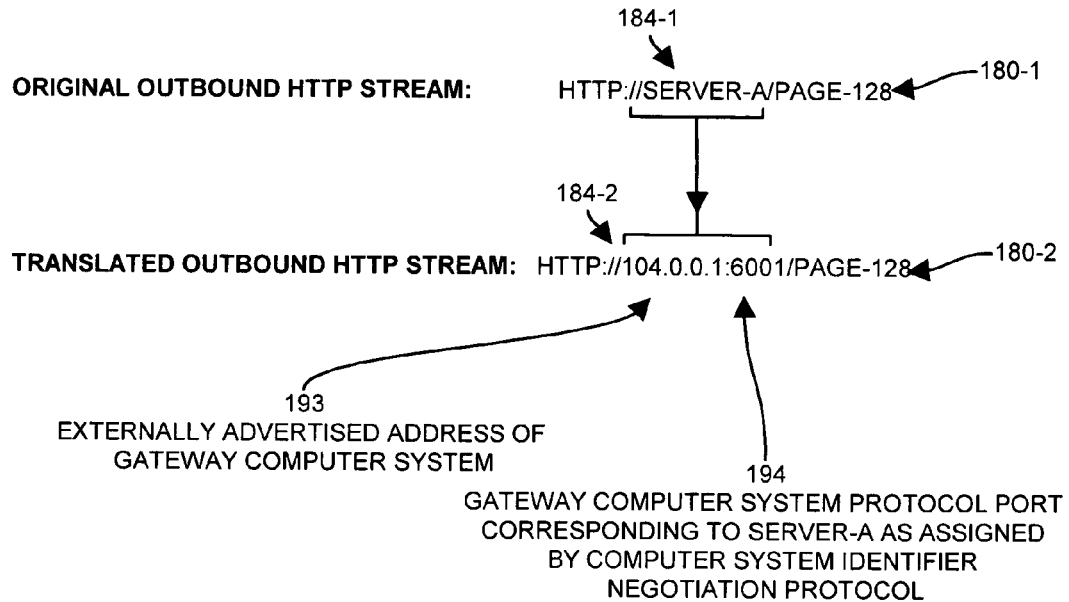

FIG. 4

| 210-A INTERNAL NETWORK COMPUTER SYSTEM ADDRESS (E.G., IP ADDRESS OF SERVER ON INTERNAL NETWORK) | 210-B INTERNAL NETWORK DESTINATION PORT (E.G., DESTINATION PROTOCOL PORT TO BE USED TO REFERENCE SERVER) | 210-C INTERNAL COMPUTER SYSTEM HOST NAME (E.G., HOST NAME OF SERVER) | 210-D C.S.I. FROM RANGE-A (E.G., G.C.S. PORT ASSIGNED TO REFERENCE INTERNAL COMPUTER SYSTEM FROM EXTERNAL NETWORK) |
|---|---|---|---|
| 10.0.0.1 | 80 | SERVER-A | 6001 |
| 10.0.0.2 | 80 | SERVER-B | 6002 |
| 10.0.0.3 | 80 | SERVER-C | 6003 |
| ... | ... | ... | ... |

210 REFERENCE TRANSLATION DATA STRUCTURE (E.G., TABLE)

FIG. 5

APPARATUS AND METHODS FOR PROVIDING AN APPLICATION LEVEL GATEWAY FOR USE IN NETWORKS

REFERENCE TO RELATED APPLICATIONS

This application claims the benefit under 35 U.S.C. §120 of the filing date of U.S. patent application Ser. No. 09/693,732 filed Oct. 21, 2000 (pending).

BACKGROUND OF THE INVENTION

A computer network such as the Internet can support data communications between client computer systems and installations of one or more server computer systems which are configured as a web site on the computer network. A typical web site includes at least one server computer system that operates (e.g., executes) web server software. This software "serves" web pages or other information to client computer systems that request such information from the web site. A small web site that does not contain much data (i.e., that has a small number of pages to serve) may consist of a single web server computer system coupled to a network. However, large web sites which are often commercial in nature typically include many server computer systems (web servers, application servers, load balancers, etc.) coupled together on a private, internal or local area network which then couples to a larger network such as the Internet via a router, firewall or other gateway computer system.

In web sites that include multiple servers, a web site designer may configure and operate the web site in a variety of different ways. According to one web site configuration called replication, the web site server computer systems each contain, or have access to, a complete replicated copy of the content (e.g., web pages) of the web site. In other words, each server has the ability to serve a copy of all of the web pages for the web site. As such, each web server can serve (i.e., can process) requests for web site content independently of the other web servers.

As a simplified example of a replicated web site, suppose a web site includes two web servers "A" and "B" and web pages "1", "2" and "3" which are replicated (i.e., duplicated, copied or equally accessible) on each server. A small local area network (LAN) can interconnect servers "A" and "B" to a router which in turn couples the web servers to an external network such as the Internet. The router handles the operations of transferring or routing web page requests from web browsers that operate on client computer systems on the Internet to the web servers "A" and "B" on the LAN, and also handles the transfer or "serving" of web pages from the web servers "A" and "B" to the client computer systems in response to those requests. Both web servers "A" or "B" can equally service requests for web pages "1", "2" and "3," since each server has access to these web pages.

Further suppose in this example that web page "1" references web pages "2" and "3" via hyperlinks (e.g., uniform resource locators or URLs), for example, within web page "1." Such hyperlinks may or may not specify or identify a specific server (e.g., one of servers "A" or "B") from which to obtain the web page should that link be selected or referenced by a client. For example, when a user of client browser software clicks on a hyperlinked URL to page "2" while viewing page "1", this URL in page "1" can reference page "2" from either web server "A" or "B". In this case, the URL hyperlink identifies a specific server ("A" or "B") from which to obtain web page "2" and forces that server to serve that page when a user clicks on that URL.

Alternatively, since the web pages "1", "2" and "3" are replicated across each web server within the web site, a URL referencing any of these pages need not identify a specific server ("A" or "B") from which to obtain the page. In cases where no specific server or page is specified in a request for data from a web site (e.g., a reference to a URL such as http://www.domainname.com/, where domainname is the name of the web site), the router can implement a technique called "load balancing" that allows the router to distribute requests for replicated web site content (a home page in this example) to different servers (e.g., either server "A" or server "B") within the web site. Since each server can serve all replicated pages for the site, it does not matter which server actually receives and processes the specific request for the replicated page. Load balancing techniques attempt to evenly distribute web page requests across the web servers in a web site to maximize web site performance. Various load balancing or load sharing algorithms are known in the art, some of which are discussed in Request for Comment 2391 (RFC 2391), maintained by the Internet Engineering Task Force, the teaching and contents of which are hereby incorporated by reference in their entirety.

Replicated web sites can consume large amounts of storage space since identical copies of web pages are usually stored in multiple locations for access by different servers. To avoid this problem, web site designers can employ another web site configuration technique called non-replication, in which web site content (e.g., web pages) is not replicated from server to server within the site. There are various reasons for not replicating web site data across each server within a web site. Web site security and conservation of data storage space are two of such reasons.

In non-replicated web site designs, one web server may be responsible for serving certain web site information (e.g., certain web pages related to one part or area of the web site) while other servers associated with the same web site serve other pages of information. For example, one or more servers in a web site may act as a front-end to the web site and serve the home page for the site. When clients reference the home page for the site, a load balancing router may distribute home page requests to any one of the homepage servers which then serves the home page back to the requesting client. Subsequently, when that same client references a URL within the homepage, the URL may specify a specific or secondary server within the web site to handle serving a different page referenced by that URL. As the client further interacts with the web site via this secondary web server, it may be desirable to avoid load balancing further requests for data from that client to that web site. This is because the secondary server may, during the course of the communications session between the client and the secondary web server, develop information that is specific to the client interaction with the web site. In other words, the secondary server may accumulate specific information only relevant to that client and thus load balancing should be avoided so that future client requests that take place during that communications session are directed to the proper secondary server.

As an example, consider an online retail e-commerce web site that sells books. When a client (i.e., a user operating web browser software on a client computer system on the Internet) initially connects to the web site, one of a group of home page servers within the site may provide the initial home page for the site to the client in a load balanced manner. However, once the client begins to interact with the site, for example, to select specific books to purchase, the specific or secondary server handling the selection, tracking and purchase of books on behalf of that client may need to handle all further interaction with the client for that data communications session since this secondary server becomes aware of client specific information such as what books that client is purchasing, credit card validation information, and so forth. Other servers in the web site may not have access to such client-specific information. If a load balancer were to load balance subsequent client requests for pages to another server, the other server may not be aware of client specific information for that client. As such, prior art web site design techniques allow for initial load balancing of general requests to a web site for replicated information (e.g., a homepage or other replicated data) and also allow for mechanisms to disable load balancing at some point during the communications session such that subsequent communications take place with the same server.

Another conventional technology related to the invention is called network address port translation or NAPT. Typically, network address port translation is a function performed within a router or gateway computer system which couples two or more networks together, such as coupling a LAN and the Internet. Quite often, network addresses of computer systems used on one network coupled to the router are incompatible with addresses used in the computer systems of another network coupled to the router. Accordingly, network address port translation functionality within the router allows the router to translate network addresses within packet headers of packets traveling from one network through the router to the other network, into addresses that are compatible on the other network. Network address port translation functionality can translate addresses in both directions. For example, a network address port translation router can translate packet header addresses used on the Internet into addresses that are compatible on the LAN and can also translate packet header addresses used on the LAN into packet header addresses that are useable (i.e., routable) on the Internet.

Consider the former example of the web site LAN coupled via the load balancing router to the Internet. A network administrator (e.g., a person responsible for administering the LAN) configures each web server computer system "A" and "B" with a specific network address such as an Internet Protocol (IP) address. Client and web server computer systems exchange data such as web pages within packets. Such packets contain header information that includes a source network address that identifies the source computer system (e.g., a web server) that originates the data as well as a destination network address that identifies the computer system that is to receive the packets of data. However, the network addresses that the network administrator assigns to the web server computer systems "A" and "B" within the LAN may be private or internal network addresses which are generally only usable on the LAN. Such network addresses of web server computer systems "A" and "B" may not be routable outside of the LAN (i.e., on the Internet). In such cases, the router which couples the LAN to the Internet can perform a network address port translation operation which translates source addresses in packet headers that identify a web server on the LAN to a network address of an interface of the router that is coupled to the Internet along with the port number specifically assigned to the address of the web server on the LAN. In other words, for a packet traveling from the LAN to the Internet, the NAPT router substitutes the packet header source address of the web server that originated the packet with an address of the router on the Internet along with the port number that is assigned to this source address. The router then forwards the packet containing the source address of the router interface and a port number associated with the specific web server onto the Internet for reception by the destination computer system.

If a client computer system of the Internet receives a packet containing an address translated in this manner, the client computer system can return data in other packets to the originator of the packet containing the translated address (i.e., can return data to the specific web server computer system) by referencing the source address information within the packet header. Specifically, this source information, as explained above, contains the address of the router on the Internet along with a specific port number mapped, within the router, to the originating computer system (i.e., the web server) within the LAN. The client computer system then transmits a packet containing destination address information that includes the address of the router on the Internet and the port number assigned to the web server computer system which provided the initial packet to the client. The Internet then routes the packet to the NAPT router specified in the destination address header portion of the packet. When the NAPT router receives the packet, the NAPT router detects the port number specified in the destination address information in the packet header and consults the NAPT table to determine which web server computer system within the LAN is to receive the packet. The NAPT router then forwards the packet on to that specific web server computer system.

In this manner, network address port translation functionality is able to solve the problem of translating packets between networks that use different domains of addresses which may be incompatible with one another. Though the aforementioned example illustrates network address port translation functionality with respect to translating source addresses in packet headers, network address port translation functionality can also translate destination address information within packet headers as well.

SUMMARY OF THE INVENTION

There are a number of problems associated with interfacing a web site that includes multiple non-replicated web servers that are interconnected via a private, internal or other local area network to an external network such as the Internet. Quite often, web site designers create web site constructs such as web pages, applets, servlets, scripts or other programs or data associated with a web site that contain embedded references such as URL's that refer to specific servers or other devices within the internal network that supports the web site. Such internal references may be un-resolvable or meaningless outside of the internal network of the web site. By way of example, if a web page contains an embedded reference to a specific hostname or network address of a specific server on a private web site LAN, this address or hostname may be unknown or unintelligible (e.g., unresolvable or unroutable) on another computer network such as the Internet. The invention is based in part on the observation that conventional NAPT functionality does not solve the problem of internal or private realm references to addresses or hostnames within application data or content (e.g., addresses or host names within web pages) which are unusable when a web site serves such data to a network other than the internal or private realm network.

Consider an example of a web site with two non-replicated servers "A" and "B" and three pages "1", "2" and "3". Suppose that server "A" contains (i.e., may store or have access to) and serves Page "1" (e.g., the homepage) while server "B" contains and serves pages "2" and "3." Page "1" within server "A" may contain a reference to pages "2" and "3" via two URLs that appear as follows:

URL-1 in Page "1" on server "A" to Page "2" on server "B": http://server-b/page-2

URL-2 in Page "1" on server "A" to Page "3" on server "B": http://10.0.0.2/page-3.

In this example, the URL-1 references page "2" using the hostname "server-b" to identify server "B" whereas URL-2 references page "3" using the network address "10.0.0.2" to identify server "B". The internal or private realm network address of server "B" is 10.0.0.2 and its internal or private realm hostname is "server-b". In either case, if server "A" serves page "1" containing either of these URLs to a requesting client, it may present some problems related to network operation, as explained below.

In the case of URL-1, should a user of the requesting client on the Internet use a client browser to select (e.g., via clicking) URL-1 in page "1", the client browser outside of the internal or private realm network (i.e., outside of the LAN) must resolve the hostname "server-b" into a network address (e.g., an IP address) in order to formulate a return "HTTP GET" request to retrieve page "2" from the web site. In other words, if a client on the Internet references URL-1 within web page "1," this client might not be able to determine the network address of the server "server-b" within URL-1 since the hostname "server-b" is not resolvable outside of the LAN on which server-b resides. It may be that the web site internal network uses hostnames (e.g., server-a and server-b) that are un-resolvable via a domain naming service (DNS) outside of the internal network of the web site.

In the case of URL-2, the issue of un-resolvable hostnames is solved because the specific network address of the web server that can serve the web page is specifically contained within the URL-2. However, because the specific address 10.0.0.2 is in the private address space of the LAN, it will not be routable to the LAN from the Internet. Accordingly, it is improper and possibly impossible to serve a web page containing URL-1 or URL-2 from a private or internal realm LAN to a client computer system on another network such as the Internet due to the aforementioned complications. Conventional NAPT functionality may properly handle address translations within packet headers, but is of little use in handling addresses or host name references within application data or content transported by those packets.

Conventional solutions to such problems include allowing the hostnames and network addresses of computer systems on an internal network to be resolvable and identifiable outside of the internal web site network. For example, if a web site is designed with content (e.g., web pages) that contains hostnames or address references to other servers on the site, network administrators can expose the site to the Internet such that routers within the Internet can route data directly to web servers within the site. Providing such hostnames and/or network addresses outside of the internal web site network requires all network address selections to conform to Internet standards governed by a third party organization referred to as an Internet Assigned Numbers Authority (IANA). Such organizations can charge fees associated with the registration of host names and network addresses for use on publicly accessible networks such as the Internet.

However, if this conventional solution is used to solve the problem, there may still be only a limited number of addresses available for use by the internal network. Thus if many computers require addresses, there may not be enough addresses for assignment to computer systems within a specific domain of addresses assigned to that network. This is one reason why internal or private networks often use addresses that do not conform to (i.e., that are out-of-bounds with) Internet addressing standards since they are private addresses.

Another conventional solution to such problems is to reconfigure the references within a web site such that web pages or other web site constructs that contain such references refer to servers that are allowed to be exposed to external networks. In other words, a web designer can manually rewrite the HTML contents of all web pages (e.g., URLs referencing internal servers) with references (e.g., host names and/or network addresses) to servers that are accessible from external networks. Doing so allows the private realm web site to be fully exposed to the Internet. This is because any pages that contain hostnames or addresses which are incompatible with the Internet are manually changed to compatible hostnames and addressing information which is usable (i.e., resolvable or routable) on the Internet. The web designer can then relocate the pages referenced by those references to the externally exposed servers such that those servers can be freely accessed by clients. This solution is typically not viable due to the amount of work required in locating and redirecting (i.e., re-coding) all content references.

In contrast to the above-described conventional approaches, the present invention significantly overcomes these and other problems associated with coupling a web site that includes servers interconnected via an internal network to an external networks such as the Internet. In particular, certain embodiments of the invention provide systems and techniques that allow access by third party computer systems (e.g., clients on the Internet) to any internal, private or local area networks such as a web site internal network (e.g., a group of web server computer systems interconnected to operate as a web site) without requiring that the addresses of the computer systems on the internal network, such as host names and internal network addresses, be resolvable/routable on the external network. As will be further explained, if an existing web site employs the systems and techniques of the present invention, there is no need to modify the contents of existing web pages or other application data within the site. The present invention enables handling all issues related to translating hostname and network address identities contained in content references (e.g., URLs) to computer systems on the internal network into identifiers that can be used by computer systems on an external network such as the Internet.

References to computer systems on an internal network that are handled according to this invention may include hostname and/or network addresses contained in URLs, for example, and also may include any other references to internal network computer systems within any type of web site construct or other application data such as an HTML web page, a Java applet, JavaScript, Servlets, scripts, programs, or other portions of data that are served from the computer systems on an internal network equipped with the invention. Generally, a computer system on a first network, that provides data to a computer system on a second network, and in which that data contains a reference to a computer system on the first network, can use the invention to translate the reference to an identifier that can be used by the computer system on the second network to identify the computer system referred to by the reference.

Moreover, other references to computer systems on an internal network to which this invention applies include network addresses contained in data communications protocol headers. As will be explained further, the invention is capable of translating such references in real-time into translated references which are usable by clients or other computer systems on an external network.

More specifically, the invention provides various method embodiments that include a method for translating a reference to a computer system on an internal network for use by a computer system on an external network.

One such method embodiment comprises the steps of detecting, in a portion of data to be sent from the internal network to the external network, a reference (i.e., an original reference) to a computer system on the internal network. The portion of data may be a web page, or any other type of application data. The reference may be a hostname, network address or other specific reference to a computer system on the internal network. The method determines a computer system identifier (e.g., a protocol port number) that is mapped or otherwise assigned to the computer system on the internal network specified in the reference. Next, the method replaces the reference specifying the computer system on the internal network contained in the portion of data with a translated reference. The translated reference contains the computer system identifier and a reference to a gateway computer system coupled to the internal network, such that subsequent referrals to the translated reference are directed to the gateway computer system instead of the computer system on the internal network. In this manner, the translated reference hides the true identity of the computer system on the internal network as specified in the original reference.

In another embodiment, the portion of data is a web site construct such as a web page, an applet, script, or the like to be served by a web server computer system on the internal network. Also in this embodiment, the reference to a computer system on the internal network in the portion of data is a portion of a uniform resource locator (URL) or other such resource identifier contained within the web site construct that identifies a server computer system on the internal network that can serve a portion of data identified by the uniform resource locator. The reference to the gateway computer system is a network address of the gateway computer system and the computer system identifier is a port reference within an interface having the network address of the gateway computer system that is mapped to the computer system on the internal network specified in the reference. Using this technique, the system of the invention can translate URLs which contain references to other server computer systems on the internal network into URLs that contain translated references which hide the identity, such as a hostname or network address, of those internal network servers. Instead, the translated reference includes an advertised gateway interface address and a port number which is assigned or mapped to the computer system identity in the original reference.

In another embodiment, the method includes the step of receiving, at the web server computer system, a request for the portion of data. Also in this embodiment, the steps of detecting, determining and replacing are performed within the web server computer system in response to the web server receiving the request for the portion of data, such that the reference to a computer system on the internal network in the portion of data is translated via the steps of detecting, determining and replacing, into a network address of the gateway computer system and a port reference in the gateway computer system that is mapped to the computer system on the internal network specified in the reference.

While the foregoing is specific to Web pages, the method is more generally applicable to any type of packet "payload", i.e., data carried in IP packets for specific purposes.

In yet another embodiment, the portion of data is a packet of data arriving at the gateway computer system coupling the internal network to the external network and the reference to a computer system on the internal network in the portion of data is a header portion of the packet of data containing a network address of at least one computer system on the internal network. Also in this embodiment, the reference to the gateway computer system is a network address of the gateway computer system and the computer system identifier is a port reference in the gateway computer system that is mapped to the computer system on the internal network specified in the reference. In this manner, the system of the invention can translate references contained in application data (e.g. in a web page) or references to internal network computer systems that appear in other packet payload data.

In another aspect, the method includes the steps of receiving, at the gateway computer system, the packet of data for transmission from the internal network to the external network. In this embodiment, the method is employed in a gateway computer system to translate references to the current packet headers. Using a reference translation data structure resulting from the use of a port negotiation protocol within the internal network, the gateway computer system translates any references within the header portion of the packet of data containing a network address of at least one computer system on the internal network into a network address of the gateway computer system and a port reference in the gateway computer system that is mapped to the computer system on the internal network specified in the reference.

In another embodiment, in the portion of data, the reference to the computer system on the internal network includes a hostname of the computer system on the internal network. In this case, the method includes the step of resolving the hostname of the computer system on the internal network into a network address of the computer system on the internal network. A domain naming service (DNS) may be used for this purpose. Also in this embodiment, the step of determining a computer system identifier that is mapped to the computer system on the internal network includes the step of selecting, as the computer system identifier, a port reference within the gateway computer system that matches the network address of the computer system on the internal network identified by the hostname.

In still a further embodiment, the step of determining a computer system identifier that is mapped to the computer system on the internal network includes the steps of determining if a reference translation data structure contains an entry corresponding to the computer system on the internal network specified in the reference, and if so, selecting the computer system identifier from the entry corresponding to the computer system specified in the reference, and if not, assigning an appropriate computer system identifier to the computer system on the internal network specified in the reference by using a computer system identifier negotiation protocol. Using these techniques, a computer system performing the translation operation of the invention can consult the reference translation data structure for mappings between computer system identifiers and hostnames or network addresses.

In another embodiment, the step of assigning an appropriate computer system identifier to the computer system on the internal network specified in the reference by using a computer system identifier negotiation protocol includes the steps of creating an entry in the reference translation data structure corresponding to the computer system on the internal network specified in the reference and selecting a port reference to a protocol port of an advertised network interface in the gateway computer system. The method then enters the port reference as the computer system identifier in the entry in the reference translation data structure corresponding to the computer system on the internal network specified in the reference. In this manner, a computer system identifier negotiation protocol such as the "Simple Port Negotiation Protocol" can be responsible for obtaining mappings between computer system identifier protocol port numbers for gateway interfaces and corresponding server computer system hostnames and network addresses.

In another embodiment, the step of selecting a port reference selects a protocol port from a predefined range of ports which are assigned to computer systems on the internal network. There may be another predefined range used in twice NAPT for computer systems (e.g., clients) on the external network.

In still another embodiment, the computer system identifier negotiation protocol is a port negotiation protocol that dynamically creates, in an entry in the reference translation data structure, a one-to-one mapping between a protocol port on the gateway computer system and a computer system network address of the computer system on the internal network specified in the reference.

In yet another embodiment, the computer system identifier is a port reference on the gateway computer system mapped to the computer system on the internal network specified in the reference and the reference to the gateway computer system is an advertised network address of the gateway computer system and is resolvable on both the internal and external networks. Also in this embodiment, the step of replacing creates a translated reference that contains the advertised network address of the gateway computer system and the port reference on the gateway computer system that is mapped to the computer system on the internal network specified in the reference.

In still another embodiment, the method includes the steps of forwarding the portion of data containing the translated reference to a client computer system on the external network and receiving, from the client computer system on the external network, a request for data based on the translated reference which is referenced by the client computer system on the external network. The method then translates the translated reference containing the computer system identifier and a reference to the gateway computer system into a reference identifying a server computer system on the internal network that is mapped to the computer system identifier. The method then forwards the request for data to the server computer system on the internal network identified in the reference. This method is typically employed in a gateway computer system which receives requests for web pages from client computer systems and translates addresses in packet headers of those requests into translated references.

In another embodiment, the portion of data is a first portion of data and the step of determining a computer system identifier that is mapped to the computer system on the internal network specified in the reference comprises the steps of determining if a request for a second portion of data associated with the reference contained in the first portion of data can be load shared across computer systems on the internal network. If it is determined that this is so, the method selects a computer system identifier that identifies the translated reference as a reference that can be load shared, such that requests made for the second portion of data using the translated reference are load shared across computer systems on the internal network. If it is determined that requests for the second portion of data cannot be load shared, or in other words, the second portion of data is unique to a specific server computer system on an internal network, the method determines determining a computer system identifier that is mapped to the computer system on the internal network specified in the reference.

According to this technique then, the system of the invention can determine if the portion of data is to be served by load sharing requests for the portion of data (e.g., across servers in a web site) and if so, can select a computer system identifier which is generic in nature such that a translated reference which is subsequently access or referred to by a client causes a request for the portion of data that identifies the generic computer system identifier which the gateway computer system will then handle in a load sharing manner. Conversely, if the second portion of data referred to in the reference is unique to a specific server computer system, the system of the invention selects the appropriate computer system identifier (e.g. protocol port assigned to this computer system) for the translated reference such the gateway computer system will directly forward subsequent requests for data associated with, for example, a URL containing the translated reference to the internal network computer system (e.g., a specific server) associated with the specific computer system identifier chosen for the translated reference.

Other embodiments of the invention relate to methods for translating a reference to a computer system.

One such method comprises the steps of receiving, with (e.g., embedded within, or, in addition to) a portion of data being transmitted from an external network to an internal network, a reference specifying a computer system. In this case, the portion of data may be a packet containing a request for data sent from a client computer system on the external network to the internal network. The reference specifying the computer system in this case is an address of the gateway computer system and a port number which the gateway computer system maps to a specific server computer system within the internal network. The method further includes steps of determining a computer system identifier specified in the reference and determining if the computer system identifier is associated with a specific computer system on the internal network. If the computer system identifier is not associated with the specific computer system on the internal network, the method load balances the request by forwarding the portion of data to any one of a plurality of computer systems within the internal network. Alternatively, if the computer system identifier is associated with the specific computer system on the internal network, the method performs the steps of determining the specific computer system on the internal network that corresponds to the computer system identifier specified in the reference, and replacing the reference specifying the computer system in the portion of data with a reference specifying the specific computer system on the internal network that corresponds to the computer system identifier specified in the reference, and then forwarding the portion of data to the specific computer system on the internal network that corresponds to the computer system identifier specified in the reference. In this manner, inbound requests for data to can be based on translated references and these translated references can indicate via an appropriate computer system identifier whether or not the request is to be load shared.

In another embodiment, the step of forwarding the portion of data to any one of a plurality of computer systems within the internal network forwards the portion of data according to a load balancing technique. Various load balancing techniques are known to those skilled in the art and such techniques can be employed by the system of the invention.

In another embodiment, the portion of data is a packet transferred on the external network to a gateway computer system. The portion of data is received by the gateway computer system which couples the internal network to the external network and the reference specifying a computer system in the portion of data that is received is a network address of the gateway computer system. The computer system identifier that corresponds to a specific computer system on the internal network is a port reference to a port in the gateway computer system that is mapped to the specific computer system on the internal network. In this manner, the system of the invention is able to maintain a mapping of data communications protocol ports within an advertised network interface on the gateway computer system which is accessible by both the internal and external networks. The system maps these ports to identities of computer systems on the internal network. Network address port translation (NAPT) techniques can assist in part in providing such mappings and in some configurations, a range of ports (e.g., RANGE-A) can be reserved to be assigned to internal network computer systems such as servers and another range (e.g., RANGE-B) of ports can be reserved for assignment to an external network computer systems such as clients. In this case, twice network address port translation techniques can be used to assist in translating references within packet headers only, such that computer systems on both the internal and external networks are unaware of each others identity via packet header addresses.

To this end, in yet another embodiment, the gateway computer system operates a load sharing network address port translation protocol (e.g., NAPT or twice-NAPT) and the reference specifying a computer system in the portion of data is a header portion of the packet.

Other embodiments include methods for serving a web site construct from an internal network to an external network.

In one such embodiment, the method comprises the steps of receiving, at a web server on the internal network, a request for a web site construct and translating a reference specifying a computer system on the internal network contained with the web site construct to a translated reference. The translated reference includes a computer system identifier that is mapped to the computer system on the internal network specified in the reference and a reference to a gateway computer system coupled to the internal network. The method also includes serving the web site construct containing the translated reference to a computer system on the external network such that the computer system on the external network is unaware, via the translated reference, of a specific identity of the computer system on the internal network specified in the reference.

Other embodiments of the invention include computer systems configured to perform all of the methods, techniques and operations disclosed herein as the invention.

In one such embodiment, a computer system is provided that comprises a processor, a network interface, and a memory system encoded with logic instructions and data including an application level gateway reference translator process and a reference translation data structure. The computer system also includes an interconnection mechanism coupling the processor, the network interface, and the memory system. In this computer system, when the application level gateway reference translator process is performed on the processor, the processor is able to perform the steps of detecting a reference to a computer system on the internal network in a portion of data in the memory system to be sent via the network interface from the internal network to the external network and, determining, within the reference translation data structure, a computer system identifier that is mapped to the computer system on the internal network specified in the reference, and replacing the reference specifying the computer system on the internal network contained in the portion of data in the memory system with a translated reference. The translated reference contains the computer system identifier and a reference to a gateway computer system coupled to the internal network, such that subsequent referrals to the translated reference are directed to the gateway computer system instead of the computer system on the internal network. Various techniques and operations of the invention are disclosed herein that relate to the server computer system. Other embodiments can perform such tasks on a gateway computer system.

In another computing system embodiment, a gateway computer system is provided that comprises a processor and a memory system encoded with logic instructions and data including an application level gateway reference translator process and a reference translation data structure. An interconnection mechanism coupling the processor and the memory system is also provided. When the application level gateway reference translator process is performed on the processor, the processor performs the steps of receiving, with a portion of data (A 1200) being transmitted from an external network to an internal network, a reference specifying a computer system and determining a computer system identifier specified in the reference. Then the processor determines if the computer system identifier is associated with a specific computer system on the internal network, and if not, forwards the portion of data to any one of a plurality of computer systems within the internal network, but if so, performs the steps of determining the specific computer system on the internal network that corresponds to the computer system identifier specified in the reference, and replacing the reference specifying the computer system in the portion of data with a reference specifying the specific computer system on the internal network that corresponds to the computer system identifier specified in the reference, and forwarding the portion of data to the specific computer system on the internal network that corresponds to the computer system identifier specified in the reference.

Embodiments of the invention also include computer program products such as disks, or other computer or device readable media (e.g., CD-ROMS, tape, flash proms, ROMs, memory systems) that have a computer-readable medium including computer program logic encoded thereon, such that the computer program logic, when executed on at least one processing unit with the computerized device, causes the at least one processing unit to perform any or all of the methods, techniques and operations disclosed herein as the invention.

The methods and arrangements of the invention are preferably implemented primarily by computer software and hardware mechanisms within a data communications device or other computer system apparatus. The computer program logic embodiments, which are essentially software, when executed on at least one processing unit with the data communications device, causes the at least one processing unit to perform the techniques outlined above, as well as all operations discussed herein that can be performed by software program(s) executing on computer hardware, circuitry or within the processing device. In other words, these arrangements of the invention are generally manufactured as a computer program stored on a disk, memory, card, or within a prepackaged operating system or other such media that can be loaded into a computer or data communications device to make the device perform according to the operations of the invention.

The features of the invention, as summarized above, may be employed in data communications devices and other computerized devices and software systems for those or other devices such as those manufactured by Cisco Systems, Inc. of San Jose, Calif.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

FIG. 4 illustrates a specific example of outbound reference translation for a URL according to one embodiment of the invention.

FIG. 5 illustrates an example of a reference translation data structure used by the system of the invention to translate references in accordance with embodiments of the invention.

DETAILED DESCRIPTION OF PREFERRED EMBODIMENTS

Figure 1:
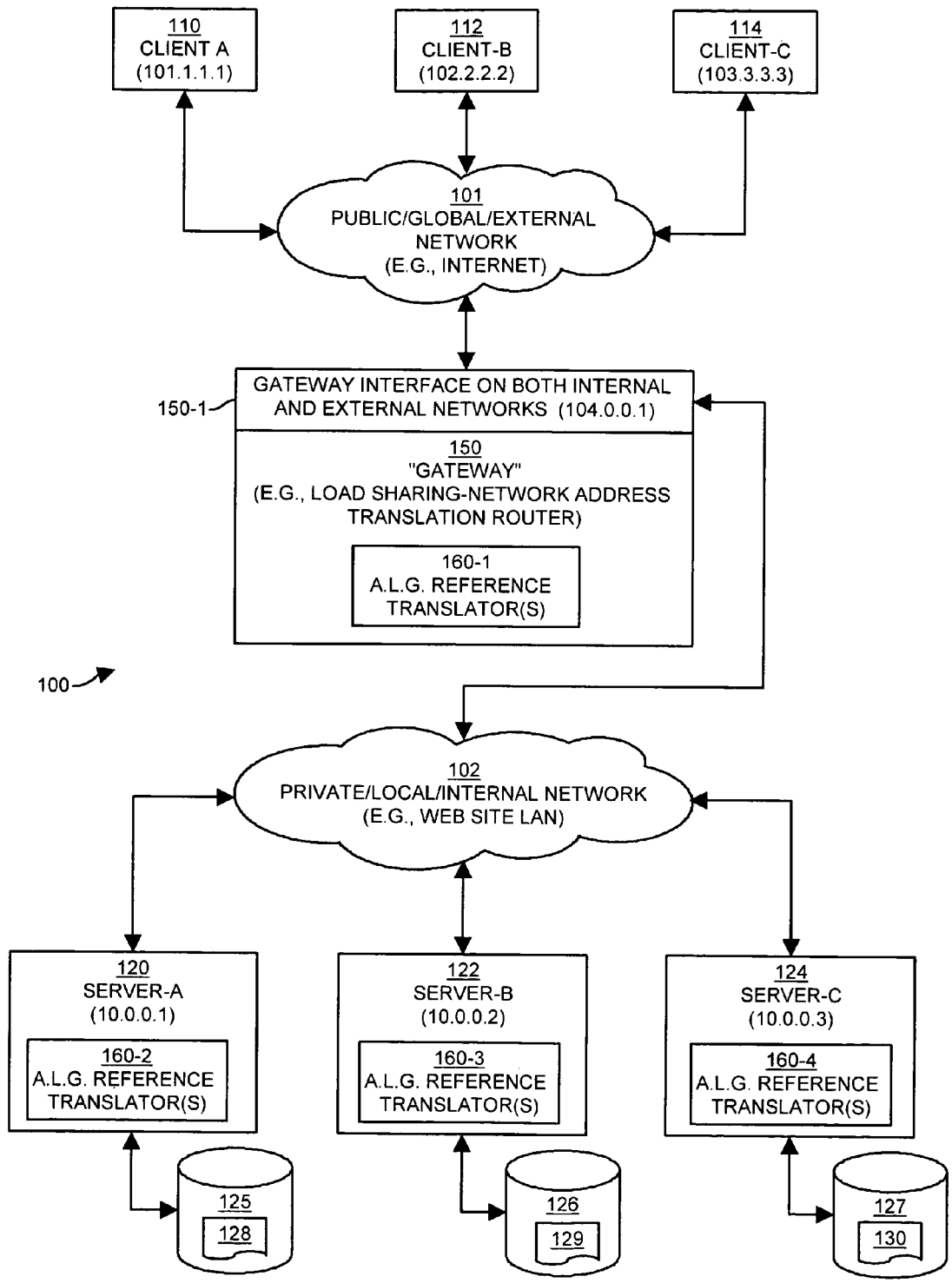
FIG. 1 illustrates a networked computer system environment including a web site configured in accordance with embodiments of the invention.

The present invention provides systems and techniques which can be incorporated into computer systems within a local area, internal, or private computer network to allow those computer systems to compatibly provide or "serve" data (e.g., web pages, files or other constructs) to computer systems located on an external or public computer network such as the Internet. The invention allows this to occur even though references such as hostnames and/or network addresses of computer systems within the internal network that are contained within portions of data (e.g., in application data such as web pages, or in data communications protocol information such as packet headers) might not be compatible with the computing system environment on the external network. The invention provides systems and techniques that transform these references (e.g., original references) into a format referred to herein as a "translated reference" that allows the internal and external networks to exchange these portions of data via a gateway computer system in a compatible manner, even though the original references before such translation may not be compatible (e.g., resolvable or routable) on the external network.

Embodiments of the invention that provide the translated references enable, for example, a web site containing web pages that have internal network-specific references such as URLs that contain hostnames or network addresses of computer systems on the internal network to be served to computer systems (e.g., clients) on the external network without having to manually modify or edit such pre-existing references within the web site constructs (e.g., web pages) and without having to expose or "open-up" the internal network computer system (e.g., web servers) for direct access by computer systems (e.g., clients) on the external network. The invention translates references automatically and the translation provides privacy and security with respect to the references from the perspective of an external network by masking or hiding the specific network addresses and/or hostnames of computer systems on the internal network.

By way of example, in a web site environment implemented using an internal network, web page constructs such as HTML web pages, applets, scripts, servlets or the like frequently reference other web page constructs via references such as URLs. The URLs may contain references to particular identities of internal network computer systems such as a hostnames or network addresses. Such internal references are frequently only meaningful or useable by other computer systems on the internal network and are un-routable or un-resolvable (e.g., via a host or domain name resolution service or protocol such as the Domain Naming Service or a routing protocol) in external computer systems on an external network such as the Internet. Perhaps the internal network is coupled to the external network via a network address port translation gateway computer system (e.g., a NAPT or twice-NAPT router) which serves as a firewall between the internal and external networks. A conventional NAPT router insulates clients on the external network from having to resolve internal network addresses in packet headers for computer systems on the internal network. As such, the internal network might use an entirely separate (or overlapping) domain of hostnames and/or network addresses for the computer systems on the internal network.

However, as noted above, a problem with conventional NAPT schemes is that an entire web site may exist and might include hundreds or thousands of web pages which cross-reference each other via URLs that use such internal references and that are embedded with the web page or other application data. Since conventional NAPT routers only translate network address within packet headers, they do not handle the issue of internal address or hostname references within the packet payloads (i.e., within URLs in web pages, in this example) that transport the application data.

The system of the invention allows the administrator of such a pre-existing web site to allow internal web servers to serve web pages to client computer systems on an external network such as the Internet, without having to manually modify all of the internal references in the various web pages of the web site to conform to externally resolvable references. Moreover, in web site environments that use load balancing, the system of the invention provides mechanisms and techniques that support the use, or avoidance of, load balancing in a manner that is compatible with the objectives of load balancing. As explained above, in a load balancing environment, in many cases, requests for data from clients on an external network might initially only be capable of being served by any one of multiple web servers within a web site environment (e.g., the home page servers), while other (e.g., subsequent) requests from clients for other data might need to be serviced by particular or specific web servers within the web site environment. In the first case, the requests can be load balanced, while in the later case they cannot. The system of the invention is able to produce translated references within web pages that can indicate if the translated reference, when selected for example as a hypertext linked URL on a client on the external network, is to be load balanced or not after client selection of this translated reference.

FIG. 1 illustrates an example of a networked computing system environment 100 suitable for use by the present invention. The environment 100 includes a private, local area or internal computer network 102, which is a web site LAN in this example. The internal network 102 interconnects a number of web servers 120, 122 and 124. Each web server 120 through 124 includes a data storage system 125, 126, 127 that stores respective portions of data (e.g., web pages, applets, scripts, etc.) 128, 129 and 130. Each web server 120 through 124 is also equipped with one or more Application Level Gateway (A.L.G.) reference translators 160-2, 160-3, 160-4. A gateway computer system 150 couples the internal network 102 to a public, global or external network 101, such as the Internet, via an advertised network interface 150-1 which couples to both the internal and external networks 101, 102. The gateway computer system 150 also includes an ALG reference translator 160-1. Various client computer systems 110, 112 and 114 couple to the external network 101. In this example, the servers 120, 122 and 124 are not replicated servers and thus the portions of data 128, 129 and 130 are distinct and different from each other and may contain references such as URLs that reference other portions of data stored by various servers 120 through 124 on the internal network 102.

In this example, each client computer system 110, 112 and 114 has a respective client hostname (CLIENT A, CLIENT B, CLIENT C) and a respective network address shown in parentheses (IP addresses 101.1.1.1, 102.2.2 and 103.3.3.3). Likewise, each server computer system on the internal network 102 has a respective server hostname (SERVER-A, SERVER-B, SERVER-C) as well as a respective example network address (IP addresses 10.0.0.1, 10.0.0.2 and 10.0.0.3). The advertised network interface 150-1 of the gateway computer system 150 has an example assigned network address 104.0.0.1 and a hostname of "GATEWAY", both of which are known (i.e., resolvable or routable) on both the internal and external networks 101, 102.

The web site in this example is generally comprised of the gateway computer system 150, the internal server computer systems 120, 122 and 124 and the internal network 102 which connects these components. Preferably, the gateway computer system 150 is a network router that is capable of routing traffic between the external and internal networks 101 and 102 and is capable of performing conventional NAPT and load-balancing functionality, as well as additional functionality provided by this invention. In its capacity as a NAPT router, the gateway computer system 150 can route network traffic in the form of packets, cells or other units (collectively referred to herein as packets) between the external and internal networks 101 and 102 using conventional NAPT techniques to translate network addresses (e.g., source and destination IP addresses) in packet headers. The network interface 150-1 which handles this traffic is called an "advertised network interface" since its host name (e.g., GATEWAY) and network address (104.0.0.1) are known and are DNS resolvable and routable on both the external and internal networks 101, 102. Conversely, the hostnames and network addresses of the server computer systems 120, 122 and 124 are not resolvable outside of the internal network 102, and likewise, the hostnames and network addresses of the client computer systems 110, 112 and 114 are not resolvable within the internal network 102

In operation, suppose that one of the external client computer systems 112 desires to access a portion of data (e.g., web page 130) stored by the internal server computer system 124 "SERVER-C". The web-page 130 may contain URLs (not specifically shown in FIG. 1) that include reference to hostnames or network addresses of other internal network computer systems 120 or 122. In this invention, prior to the server 124 serving the web page 130 to a requesting client 112, the ALG reference translator 160-4 within the server 124 translates all internal references that contain internal network hostnames or network addresses to translated references that mask or hide the identity of the server computer systems 120, 122 which they reference. That is, the reference translator 160-4 is capable of analyzing the web page 130 to detect references that identify a computer system within the internal network 102. Upon detecting such a reference, the reference translator 160-4 can replace the reference in the web page 130 with a "translated reference". The reference translators 160-2 and 160-3 operate in a similar manner to translate references in portions of data 128, 129 served by respective server computer systems 120, 122. That is, while this example explains the invention in operation on certain computer systems, generally, each computer system on the internal network is equipped with this technology.

The ALG reference translators 160-2 through 160-4 create a translated reference by replacing the original reference within the portion of data 130 (e.g., within the HTML of the web page) with a reference to the gateway computer system 150 along with a computer system identifier (not specifically shown in this figure) that uniquely identifies the internal network server computer system (i.e., one of servers 120 through 124) that the original reference references. In a preferred embodiment, the computer system identifier is a specific data communications protocol port associated with the advertised gateway interface 150-1 within the gateway computer system 150. The invention assigns (i.e., maps) internal network hostname and network address pairs to respective data communications protocol ports associated with the advertised gateway interface 150-1, as needed for reference translation.

Once the invention translates a reference in this manner, the server 124 then serves the web page 130 containing a translated reference through the gateway computer system 150 to the requesting client (e.g., client computer system 112 in this example). When the client computer system 112 obtains the web page 130 and thereafter selects, clicks or otherwise references the URL containing a translated reference within the portion of data 130, the client computing system 112 is unaware of the true identity of the hostname or network address of the server computer system (i.e., one of 120 through 124) to which this translated reference refers (i.e., to get another web page). Instead, if the client 112 references the translated reference, the client computer system 112 sends an inbound message (e.g., a packet, not shown in FIG. 1) to the advertised network interface 150-1 of the gateway computer system 150, as specified in the translated reference. The inbound message further specifies the computer system identifier mapped to the original reference (also contained as part of the translated reference). The gateway computer system 150 receives the inbound message and, based on the mapping, can associate a specific server computer system 120 through 124 within the internal network 102 to the request. The gateway 150 then forwards the message (e.g., as another packet) on to the specified server. In this manner, a client request for a specific web page 130 within the web site is handled by the appropriate server 120 through 124, without the identity of that server being released in references in the web page 130 that get served to the external network 101.

The ALG reference translators 160 are referred to as "application" level gateway reference translators since each translator 160 is designed to translate references specific to a certain type of application, protocol, or other defined environment. In the web site example given above, the ALG reference translators 160 are HTML/HTTP translators since they translate embedded HTML (e.g., URL) references. However, the invention is not limited as such and other ALG reference translator can exist for other protocols that perform the exchange of data between two computer systems, such as, for example, the file transfer protocol (FTP), H.323, or any other protocol which transfers data and which is susceptible to the aforementioned problems outlined in the summary.

Figure 2:
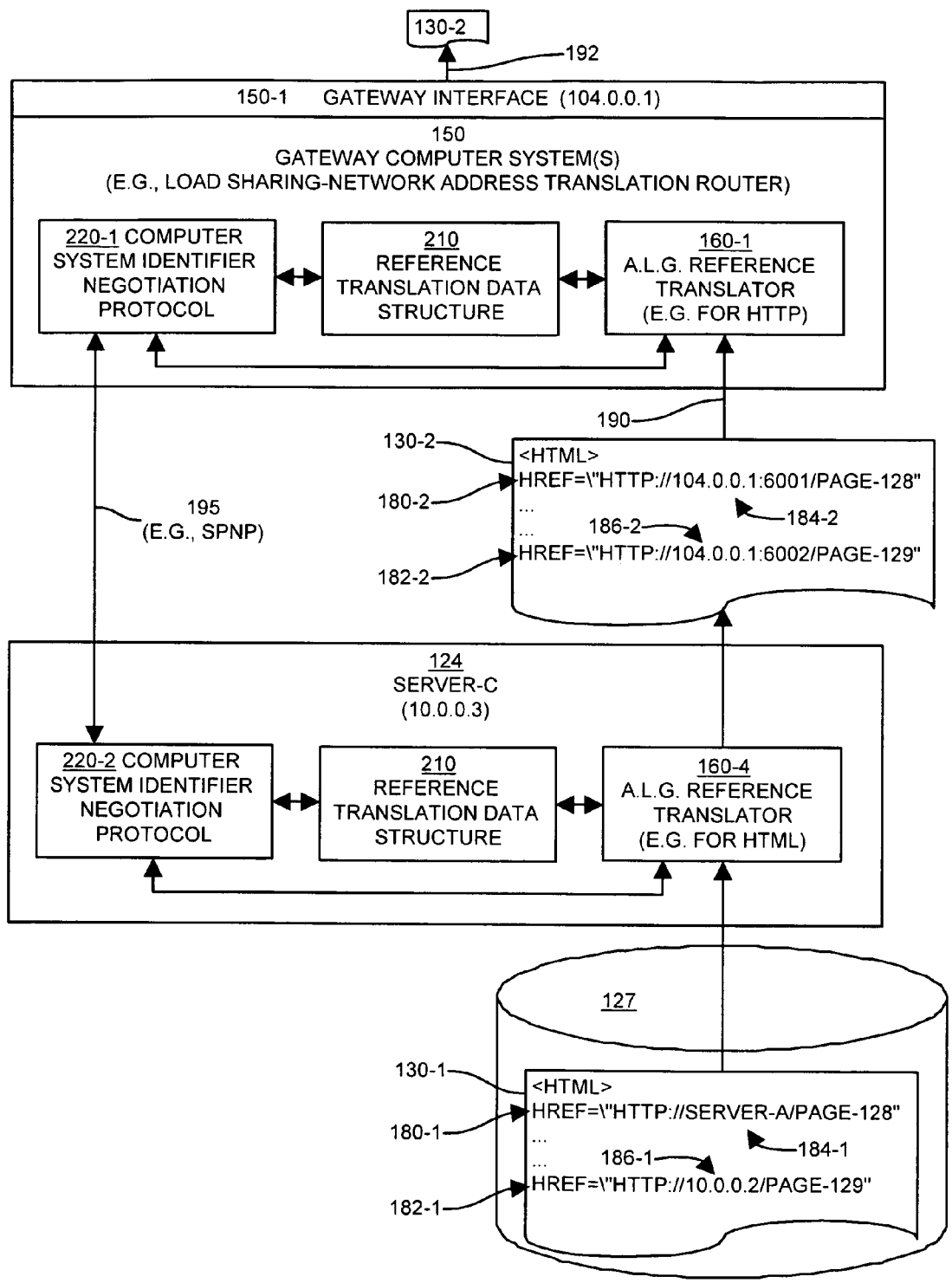
FIG. 2 illustrates a detailed example of how the system of the invention can perform translation of references in application data, which in this example is served from a web site, according to one embodiment of the invention.

FIG. 2 illustrates the configuration of an example embodiment of the gateway computer system 150 and the server computer system 124 from FIG. 1 in more detail, and is suitable for use in describing an example operation of the invention.

The gateway computer system 150 includes an ALG reference translator 160-1 as well as a reference translation data structure 210 and a computer system identifier negotiation protocol process 220-1. The server computer system 124 includes the ALG reference translator 160-4 as well as a copy of the reference translation data structure 210 (or relevant portions thereof) and a computer system identifier negotiation protocol process 220-2.

In this example, the ALG reference translator 160-4 operating within the server computer system 124 (SERVER-C) performs outbound translation operations on references 184-1 and 186-1 within URLs 180-1 and 182-1 contained within the web page 130-1. The system of the invention may perform the translation operations at any time. However, in one embodiment of the invention, the translation operations may be triggered, for example, when one of the client computer systems 110 through 114 makes a request for the web page 130-1 from the web site (the collection of servers 120 through 124). In other words, translation may take place just prior to serving application data, or may be done in advance. If done in advanced, the system of the invention can be used to "convert" or translate reference in all of the web pages associated with a web site at one time, so as to "convert" all pages in the site to a format that can be "safely" served on a public network such as external network 101.

The web page 130-1 includes two URLs 180-1 and 182-1 which each contain a respective reference 184-1, 186-1 that each respectively specify or identify a server computer system on the internal network 102. Specifically, URL 180-1 includes a specific hostname reference 184-1 to "SERVER-A" and URL 182-1 includes a specific network address reference 186-1 to the network address "10.0.0.2," which corresponds to server computer system 122 or "SERVER-B."

In this example, if the server 124 were to serve page 130-1 "as is" to a requesting client 110 through 114, the client would not be able to resolve the hostname 184-1 and would not be able to route the network address 186-1 if the client referred to (e.g., clicked on) these URLs. This is because the hostnames and network addresses on the internal network 102 are not generally made available to the external network 101. Moreover, if the server 124 were to serve the web page 130-1 and such references 180-1 and 182-1 were left alone (i.e., left un-translated), they would reveal the identities (hostnames and network addresses) of servers within the internal network 102 (FIG. 1) which raises security concerns.

Figure 3:
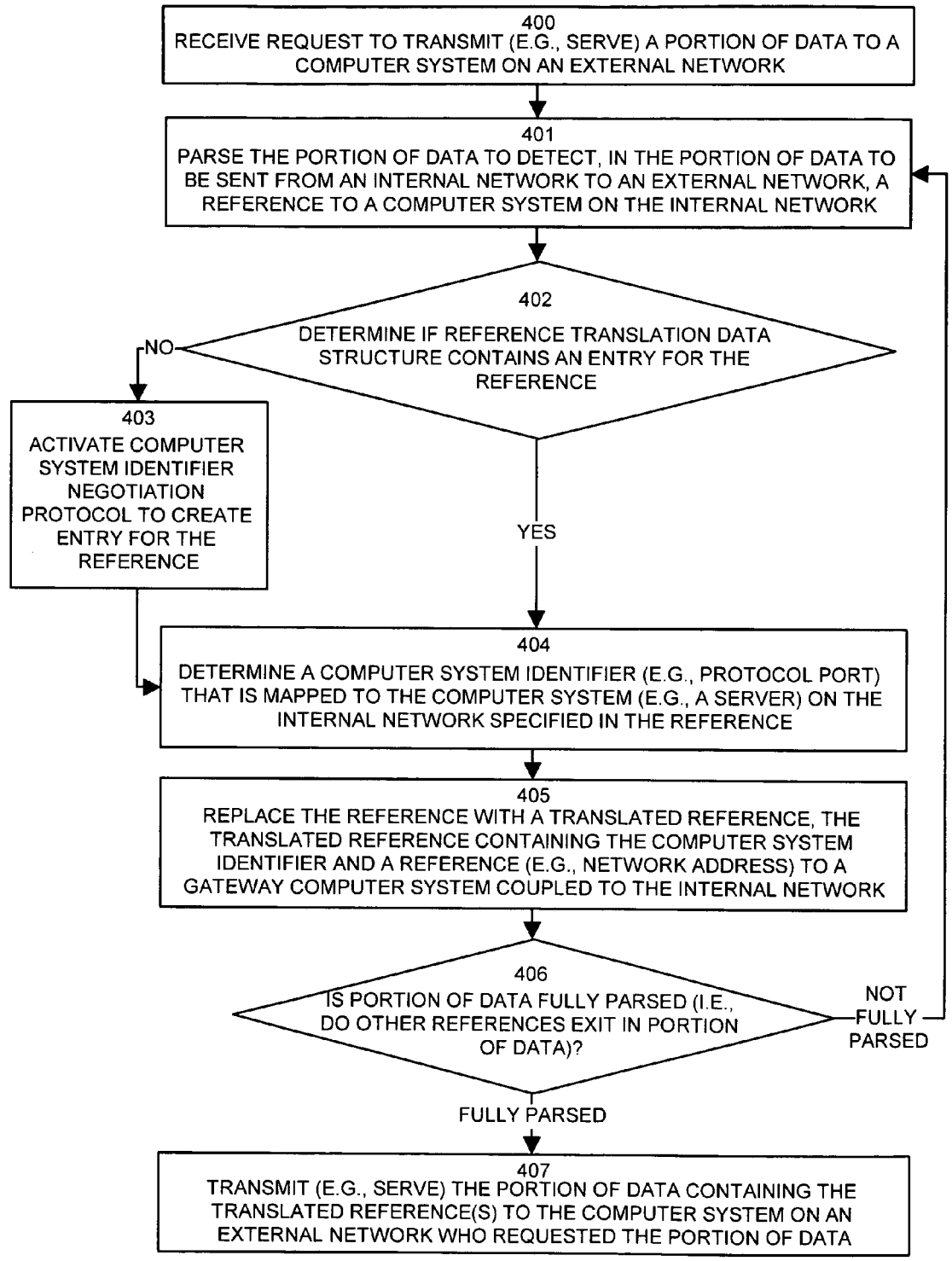
FIG. 3 illustrates a flow chart of processing steps which handle outbound reference translation for references contained in portions of data that are to be sent from an internal network to an external network according to this invention.

FIG. 3 illustrates processing steps performed by embodiments of the invention to perform an outbound translation of references contained in application data, such as that shown in the example illustrated in FIG. 2. The operation of FIG. 3 is referred to herein as "outbound translation" since the server computer systems 120 through 124 serve portions of data (e.g., web pages) from the internal network 102 out of the gateway computer system 150 to clients 110 through 114 on the external network 101.

In step 400, the reference translator 160-4 within the server computer system 124 (SERVER-C) receives a request (not specifically shown) to transmit or serve a portion of data such as web page 130-1 to a computer system such as the CLIENT-A computer system 110 on the external network 101.

Next, in step 401, the SERVER-C 124 operates the ALG reference translator 160-4 to parse the portion of data (i.e., the web page 130-1) to detect to a reference to a computer on the internal network. In this example web page 130-1, the ALG reference translator 160-4 parses the web page 130-1 and first detects, for example, the reference hostname "SERVER-A" 184-1 within the URL 180-1.

In step 402, in response to detecting the reference 184-1, the ALG reference translator 160-4 determines if the reference translation data structure 210 contains an entry (to be explained, but not specifically shown in this figure) for the reference 184-1. If in step 402, the reference translator 160-4 determines that an entry for the reference 184-1 is not present in the reference translation data structure 210, the reference translator 160-4 then performs step 403.

In step 403, the reference translator 160-4 activates the computer system identifier negotiation protocol process 220-2 to create an entry for the reference 184-1 within the reference translation data structure 210. The computer system identifier negotiation protocol process 220-2 creates such entries in the reference translation data structure 210, for example, by interacting 195 with a corresponding computer system identifier negotiation protocol process 220-1 that operates on the gateway computer system 150. Specifically, the computer system identifier negotiation protocol processes 220-1 (in the gateway computer system 150) and 220-2 (in SERVER-C) intercommunicate 195 with each other using a protocol such as the simple port negotiation protocol (SPNP) to determine a specific port number (not shown in this figure), associated with the gateway interface 150-1 in the gateway computer system 150 (i.e., associated with IP address 104.0.0.1), that is specifically assigned or mapped (via the SPNP protocol) to a server computer system 120 through 124 on the internal network 102. The reference translation data structure 210 maintains such mappings in order to allow the ALG reference translator 160-4 to translate references such as the SERVER-A hostname reference 184-1 in URL 180-1 into translated references as explained herein. In this example then, step 403 causes the computer system identifier negotiation protocol process 220-2 to retrieve via 195 a specific port number associated with the "SERVER-A" hostname reference 184-1. Processing then proceeds to step 404 from step 403.

However, if in step 402 the ALG reference translator 160-4 determines an entry exists in the reference translation data structure 210 that corresponds to the reference 184-1 to SERVER-A, then processing proceeds to step 404.

In step 404, the ALG reference translator 160-4 determines a computer system identifier (e.g., a specific port number within the gateway interface 150-1) that is mapped (e.g., via the reference translation data structure 210) to the reference 184-1 to the computer system on the internal network. In this example, the ALG reference translator 160-4 looks up an entry for the SERVER-A reference 184-1 in the reference translation data structure and determines that port number "6001" is mapped to "SERVER-A" (and to SERVER-A's IP address as well).

Next, in step 405, the ALG reference translator 160-4 replaces the reference 184-1 to SERVER-A in the URL 180-1 with a translated reference that contains the computer system identifier (port 6001) determined in step 404 along with a reference to the gateway computer system 150 coupled to the internal network 102. In this particular example, the reference to the gateway computer system 150 is the network address "104.0.0.1" of the advertised gateway interface 150-1. Accordingly, the reference 184-1 to "SERVER-A" is converted or translated to a translated reference 184-2 containing "104.0.0.1:6001." It should now be clear that should the URL 180-2 be subsequently selected from within a client 110 through 114 on the external network, an HTTP request for the web page "PAGE-128" will be directed to port 6001 within the gateway interface 150-1, instead of to SERVER-A. Such resulting operations or "use" of translated references will be explained later with respect to FIG. 6.

Next, in step 406, the ALG reference translator 160-4 determines if all references to computer systems on the internal network in the portion of data (i.e., the web page 130-1) have been translated. In other words, the reference translator 160-4 determines if there are other references such as other hostnames or network addresses of computer systems on the internal network that exist within the web page 130-1, such as for example, the reference 186-1 to the network address "10.0.0.2" contained within the URL 182-1, that have not yet been translated via steps 401 through 405. If such other references exist, processing proceeds to return to step 401 to repeat steps 401 through 405 for the next identified reference that needs to be translated in this manner.

In step 406, if all references to computer systems on the internal network (e.g., 184-1 and 186-1) have been translated, processing proceeds to step 407.

In step 407, the server computer system 124 transmits or serves the portion of data (i.e., the web page 130-2) containing the translated references to the computer system that requested the portion of data 130 on the external network 101.

Returning attention now back to FIG. 2, the portion of data containing a translated references is illustrated as the web page 130-2. The comparison of the web page 130-2 containing the translated references with the web page 130-1 containing the original references illustrates how the system of the invention hides or masks hostname or network address references to computer systems on internal network.

It is to be understood that at some point prior to, or during, the translation of references 184-1 and 186-1, the computer system identifier negotiation protocol processes 220-1 and 220-2 interoperate to dynamically map the hostname SERVER-A and its corresponding IP address "10.0.0.1" to the data communications protocol port 6001 within the network interface 150-1 of the gateway computer system 150, and also dynamically map the IP address "10.0.0.2" (and corresponding hostname SERVER-B) to the data communications protocol port number 6002 within the network interface 150-1.

Though not shown in the flow chart in FIG. 3, for references that contain hostnames, the ALG reference translator 160-4 can perform an additional step of resolving or looking-up the hostnames of computer systems on the internal network that are specified in the reference (e.g., resolving SERVER-A) into their corresponding network address of the computer system on the internal network (e.g., 10.0.0.1 for SERVER-A). A DNS server (not specifically shown) accessible to the internal network 102 can be used for this purpose. This may be the case, for example, if the reference translation data structure 210 does not contain hostnames, but only maps network addresses to computer system identifiers.

As can be seen from the example reference transformation in FIG. 2, the ALG reference translators 160 within the computer systems 120 through 124 on the internal network 102 are capable of translating application data references to computer systems coupled to or associated with the internal network 102 (e.g., servers associated with a web site) into references that refer to a single network destination. The network destination is the gateway interface 150-1 within the gateway computer system 150 which is accessible on both the internal and external networks 101 and 102. For each internal computer system 120 through 124, the reference translation data structure 210 further specifies a specific corresponding data communications port number within the gateway interface 150-1 and the translated reference further specify an appropriate port number. Accordingly, when a web page such as 130-2 is served from the gateway computer system 150 to one or more of the client computer systems 110 through 114 on the external network 101, browser software (not shown) within the client computer systems 110 through 114 can only refer to URLs such as 180-2 and 182-2 that contain translated references 184-2 and 186-2. The client computer systems 110 through 114 are thus unaware of any specific hostnames or network addresses of computer systems 120 through 124 on the internal network 102.

FIG. 4 illustrates the basic elements of an example outbound address translation for application data (e.g., a portion of data such as a web page containing HTML code). In this example, the reference translator 164-1 performs a translation of the original URL 180-1 in the application data to create the translated URL 180-2. In the context of the former example in FIG. 2, the original outbound HTTP stream for the web page 130-1 contains the hostname "SERVER A." During the processing of the steps in FIG. 3, the ALG reference translator 164 translates the original reference 184-1 to "SERVER-A" into the translated reference 184-2 which includes the externally advertised address 193 (the IP address of gateway interface 150-1) of the gateway computer system 150 followed by a colon ":" and then the assigned gateway computer system protocol port 194 (having a value of 6001 in this example) that corresponds to the server computer system 120 (SERVER-A) on the internal network 102.

FIG. 5 illustrates an example of the contents of the reference translation data structure 210 as discussed in the previous examples and as configured according to one embodiment of the invention. Essentially, the computer system identifier negotiation protocol processes 220-1 and 220-2 (which implement an SPNP protocol) maintain the contents of the reference translation data structure 210. Generally, for purposes of this invention, the reference translation data structure 210 provides the mapping between network addresses and/or hostnames of internal network computer systems (e.g., 110 through 112 in the previous examples) and data communications protocol ports within the gateway interface 150-1.

As shown in this example, the reference translation data structure 210 is a table that includes five columns 210-A through 210-D. Each row in the reference translation data structure table 210 provides mapping information for one specific computer system within the internal network 102. Since the example environment 100 illustrated in FIG. 1 shows three internal network computer systems 120 through 124, three rows of mapping information are illustrated in the example reference translation data structure 210 illustrated in FIG. 5.

The first column 210-A lists internal computer system network addresses of the various computer systems on the internal network, such as computer systems 110 through 112 in FIG. 1. The second column 210-B identifies a protocol port within the internal network computer systems identified in column 1 (210-A) to which data communications should be directed. In this example, since the invention translates references embedded within web pages, and web pages are transported between computer systems using the hypertext transport protocol (HTTP), port 80 is specified in column 2 since this is the data communications protocol port to be used for HTTP communications with the internal network computer systems. It is to be understood that there is a possibility that the application port number is something other than port 80 in Column 2 as per the original URL. The third column 210-C identifies the internal network computer system hostname that corresponds to the network address listed in column 1. The fourth column 210-D indicates the computer system identifier that the reference translators 160 are to use in combination with the reference to the gateway computer system 150 (i.e. the advertised network address of the gateway computer system) when creating a translated reference. That is, the fourth column 210-D in this embodiment of the reference translation data structure 210 indicates a specific port number for the network interface 150-1 on the gateway computer system 150 that can uniquely identify one of the server computer systems within the internal network 102. As explained above, the port numbers from column 210-D are used by the ALG reference translators 160 to create translated references (e.g., 184-2, 186-2).

The computer system identifier negotiation protocol components 220 can dynamically create entries (i.e. rows mapping hostnames and addresses to port numbers) in the reference translation data structure 210 as needed. That is, the computer system identifier negotiation protocol is generally a port negotiation protocol that dynamically creates an entry in the reference translation data structure 210 that includes a one-to-one mapping between a protocol port on the gateway computer system 150 and a computer system network address and/or hostname of the computer system on the internal network specified in the reference. Details of the specific operation of the computer system identifier negotiation protocol processes 220 and specifics of the simple port negotiation protocol are further discussed in Appendix A hereto.

It is to be understood that during a reference translation process, if a reference translator 160 discovers that an entry (e.g., a row) in the reference translation data structure 210 does not exist for a hostname or a network address of an internal network computer system that is discovered in a portion of data (e.g., within an application data stream such as an HTML file or web page 130), the reference translator 160 performing the translation can indicate this event to the appropriate computer system identifier negotiation protocol component 220 which will then proceed to create the required entry or row. In other words, the computer system identifier negotiation protocol processes 220-1 and 220-2 can negotiate amongst each other to assign an appropriate port within the interface 150-1 in the gateway computer system 150 to the internet network computer system specified in the reference which does not yet have such a computer system identifier (e.g., port) assignment.

Up to this point, embodiments of the invention operate to substitute, translate or replace internal network computer system references that exist within application data (e.g., in URLs in an HTML web page) with a corresponding translated reference. The translated reference includes a network address of the gateway computer system 150 and a corresponding computer system identifier (e.g., port number) within the gateway computer system 150 that is mapped to or corresponds with the computer system specified in the original reference. However, as server computer systems 120 through 124 on the internal network transmit application data (e.g., web pages such as 130-2) containing translated references to the client computer systems (e.g. 110 through 114) on the external network 101, without any other translations taking place besides those explained above, the client computer systems 110 through 114 can still determine the specific identities (i.e., network addresses) of the computer systems (servers 120 through 124) within the internal network 102. This is because the portions of data discussed thus far have been application data that is typically served or transported within packets, cells, frames, or other data communications units (referred to herein collectively as packets). Such packets include packet header information that contains source and destination network addresses (i.e., identities) of the computer systems (both server and client) which exchange the application data. If the gateway computer system 150 transfers or routes packets containing header information including such references that specify the source addresses of the server computer systems 120 through 124 to the external network 101, the client computer systems 110 through 114 are able to determine the network addresses of the server computer systems 120 through 124.

The system of the invention is also based in part on the observation that packet headers transmitted from an internal network to an external network might contain references to computer systems within the internal network. Aside from the security issues noted above, such hostname and/or network address references might be un-routable on the external network since a network address specified by such an internal reference in a packet header might not conform to addressing conventions on the external network. In response to this observation, the system of the invention includes embodiments which can translate references, such as network addresses and port numbers within packet header portions of data that specify computer systems on the internal network, to translated references, much like the translations of references (i.e., URL addresses) within application portions of data, as discussed above.

In some embodiments of the invention, conventional network address port translation (NAPT) technology can perform such packet header address translations. Accordingly, one embodiment of the invention provides translation of references within application data as previously explained, and further relies on conventional NAPT technology to translate packet header address references (e.g., source and destination IP addresses within packets) such that computer systems on the external network 101 are unaware of the specific network addresses of computer systems on the internal network 102. Using NAPT, the external computer systems (e.g., clients 110 through 114) are unaware of internal network server computer systems identities because conventional NAPT technology causes the gateway computer system 150 to translate network addresses of internal network computer systems 120 through 124 that are contained as source addresses within outbound packets (i.e., packets the transport the web page 130-2 through the gateway computer system 150 to the client computer systems 110 through 114) into an address of the gateway interface 150-1, along with a specific data communications port number assigned to the internal network computer system that originated packet (i.e., one of the server computer systems 120 through 124 in the former examples). It is to be understood that NAPT technology only translates reference in packet headers, and does not concern itself with packet payload or application data. In the aforementioned examples, such payload data is web page information and translation of references within application data is handled by the techniques explained above.

Other embodiments of the invention operate as explained above but use another conventional NAPT technology called "twice network address port translation". Twice network address port translation operates within the gateway computer system 150 to mask or hide (i.e., translate) the identities (e.g., network addresses) of computer systems on a first network (e.g., internal network 102) as well as identities of computer systems on a second network (e.g., external network 101) from each other. In the context of the former examples, in twice network address port translation schemes, port numbers within the gateway interface 150-1 (i.e., TCP ports for the advertised gateway interface 150-1) are assigned to computer systems 120 through 124 on the internal network 102 and other port numbers of the same gateway interface 150-1 are assigned to computer systems 110 through 114 on the external network 101. In twice network address port translation then, source and destination addresses within packet headers traveling in both directions, from the internal network to the external network, and also from the external network to the internal network, are translated and thus masked or hidden using network address port translation technology. In this invention then, conventional NAPT and twice-NAPT technologies can thus translate network addresses in packet headers while application specific translations (e.g., HTTP in this example) of references in portions of application data (e.g., web pages, applets, etc.) are translated by the ALG reference translator functionality explained above.

Figure 6:
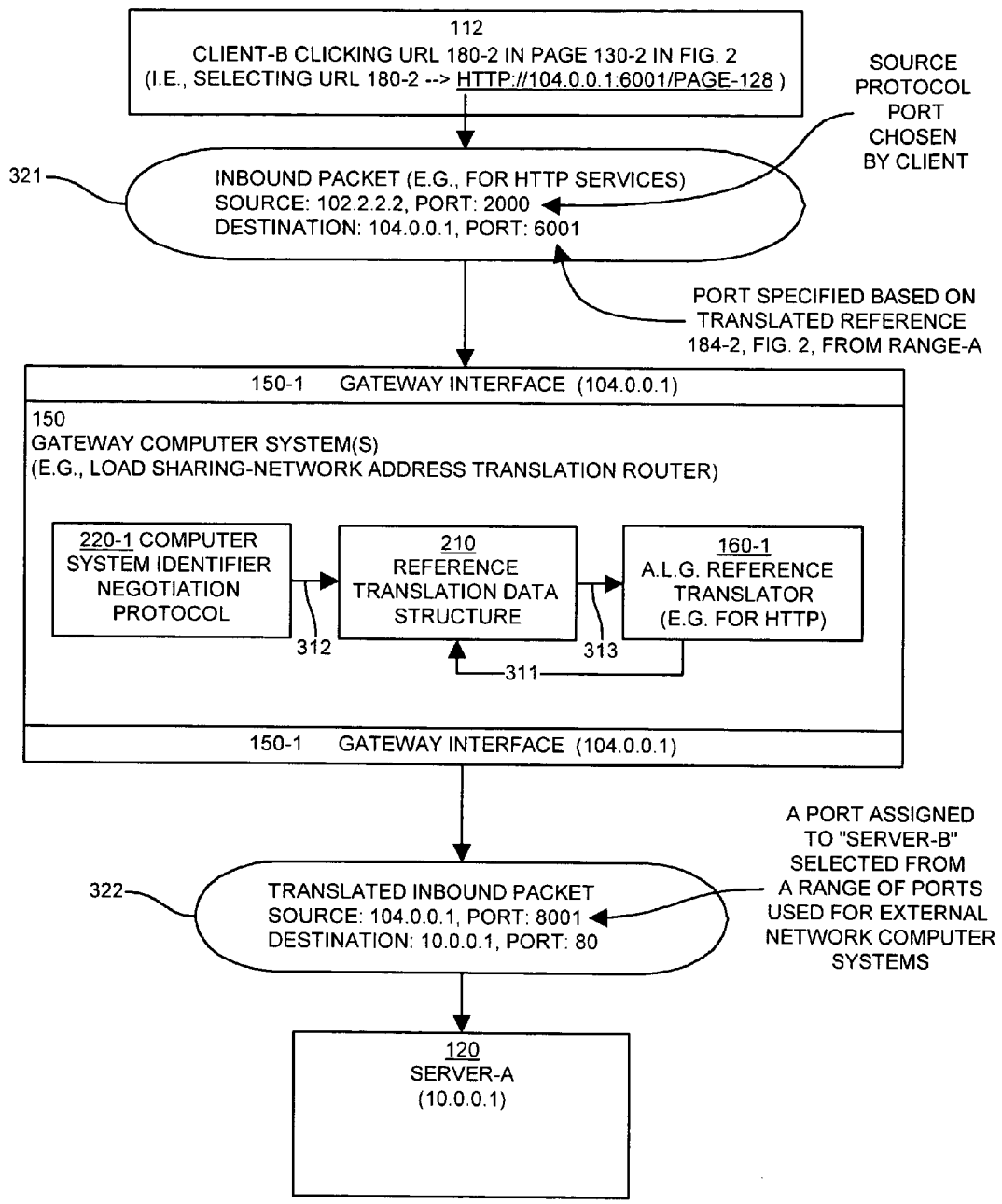
FIG. 6 illustrates how a client can refer to a translated reference created by this invention which causes the gateway computer system equipped with the invention to properly route a request (e.g., a packet) for data based on the translated reference to the proper internal network computer system.

FIG. 6 illustrates the resulting effect that the system of the invention has when a client computer system (e.g., one of clients 110 through 114) receives the web page 130-2 containing the URLs 180-2 and 182-2 that include the translated references 184-2 and 186-2 and then subsequently refers to one of the translated references.

The flow of operation of the example in FIG. 6 begins at the top of the page when a client computer system, which in this example is "CLIENT-B" 112 selects, refers to, clicks, or otherwise invokes a reference to the URL 180-2 embedded within the web page 130-2 illustrated in FIG. 2. Within the client 112, selection, for example by a user (not shown) of the URL HTTP://104.0.0.1:6001/PAGE-128 indicates that the client 112 is to retrieve the web page "PAGE-128" from the web site (i.e., the collection of servers 120 through 124 on the internal network 102).

Before explaining further, it is important to note that this URL 180-2 contains the translated reference 184-2 (specifically, network address 104.0.0.1 and port number 6001) that was created as previously explained, and thus the web page 130-2 (currently being displayed in a browser—not shown—within the client 112) containing this translated reference 184-2 in the URL 180-2 (and the translated reference 186-2 in URL 182-2, in FIG. 2) does not reveal or disclose the true identity (hostname or network address) of any server computer systems 120 through 124 within the internal network 102 to the client computer system 112. Instead, the client 112 only "sees" the translated reference "104.0.0.1," which is the advertised address of the gateway interface 150-1, and a port number "6001." The client 112 does not know which server computer system 120 through 124 within the web site on the internal network 102 is mapped to this port number.

Upon client selection of the URL 180-2, the client 112 generates an inbound packet 321 for HTTP services (e.g., an HTTP GET to retrieve web page "PAGE-128"). The inbound packet includes a packet header that contains a source network address of the packet "102.2.2.2" (the network address of CLIENT-B 112) and source protocol port "2000" chosen by the client upon selection of the URL 180-2. The packet header also contains a destination network address of the packet "104.0.0.1" and destination protocol port "6001." The destination network address "104.0.0.1" and destination protocol port "6001" are for the inbound packet are determined from the translated reference 184-2 and specify that the packet 321 is to be sent (i.e., routed on external network 101) to the gateway interface 150-1 in the gateway computer system 150, and within that interface 150-1, is to be directed to port "6001". In other words, when the client selects the URL 180-2, the translated reference 184-2 within the URL 180-2 in web page 130-2 indicates where the packet 321 requesting the web page is to be initially sent.

When the gateway interface 150-1 within the gateway computer system 150 receives the inbound packet 321, it performs NAPT functionality (or twice NAPT functionality) to determine which internal network server computer system 120 through 124 is to receive the packet contents (i.e., the HTTP GET request, not specifically shown). As explained previously, the ALG reference translators 160 can reference the reference translation data structure 210 (e.g., FIG. 5) to determine mappings between port numbers and computer system identities (hostnames or network addresses). As such, when the packet 321 arrives at the gateway computer system 150, the ALG reference translator 160-1, performing NAPT functionality, retrieves the destination port number "6001" and uses this to look-up an entry (e.g., a row) in the table 210 that contains an identity of an internal network server computer system that is mapped to this port number. In this case, as previously explained (and referring to FIG. 5), the port number 6001 maps to server computer system 120, or hostname "SERVER-A" having network address 10.0.0.1.

The ALG reference translator 160-1 within the gateway computer system 150 then constructs packet 322 which contains the true identity of the server computer system 120 (SERVER-A) as the destination network address "10.0.0.1." The ALG reference translator 160-1 sets the destination port of packet 322 to "80," which is a standardized HTTP port, since the reference translation data structure 210 contains "80" in column 210-B which defines the internal network destination protocol port to be used for inbound packets destined for SERVER-A. The gateway computer system 150 then forwards the packet 322 on to SERVER-A 120 for processing, so that SERVER-A 120 can serve the requested web page 128.

In this manner, the process of translating references existing within portions of application data results in external network client computer systems (e.g., 110 through 114) properly referencing those translated references to retrieve portions of data referenced by those translated references (e.g., in URLs that include the translated references), without compromising the identities of server computer systems 120 through 124 to which those translated references relate.

FIG. 6 also illustrates the use of twice NAPT. This is shown in packet 322 which contains "104.0.0.1" as a source address and "8001" as a source data communications protocol port number. Since the inbound request for web page PAGE-128 transported within the packet 321 originated from client computer system CLIENT-B 112 having a source network address "102.2.2.2," the twice NAPT functionality of the ALG reference translator 160-1 in the gateway computer system 150 operates to hide this address from server computer systems 120 through 124 on the internal network 102 by translating this CLIENT-B source address into the address of the gateway computer system interface 150-1 and a port number "8001" which the ALG reference translator 160-1 assigns to the client computer system CLIENT-B 112. In this manner, the ALG reference translator 160-1 within the gateway computer system 150 can maintain two separate ranges of port number used for assignment to network address. A first range of port number within the gateway interface 150-1 can be used for assignment to internal network server computer system addresses, while the second range can be used for assignment to external network client computer systems 110 through 114. In this manner, when the gateway interface 150-1 receives a packet (inbound or outbound), it merely need to look at the port number in the destination address packet header to determine which computer system on the internal or external network the packet is to be routed towards. Since both source and destination address fields are modified in this manner, the process is referred to as twice network address port translation.

It is to be understood that the aforementioned translation mechanisms and techniques allow for load sharing avoidance of web page requests, and in other cases can support load sharing. The aforementioned translation of references to an address and port number of the gateway interface 150-1 causes client computer system 110 through 114, when referring to such translated references, to have such referrals be directed to one specific internal network computer system 120 through 124. This is referred to as load sharing avoidance because the request from the client will be directed, via the gateway computer system, to a specific server computer system 120 through 124 based on the port specified in the translated request. Thus, during the translation process of FIG. 3, by specifying a specific computer system identifier 194 (FIG. 4), the web page 130-2 contains a URL that when selected will direct a request to the internal computer system associated with the computer system identifier (e.g., port number) 194.

In other embodiments where load sharing is acceptable, a generic computer system identifier or port number, or no (e.g., NULL) port at all, can be specified in step 404 of FIG. 3. In this manner, a generic computer system identifier or none at all indicates that any server computer system 120 through 124 can handle a request generated by a client when referencing the translated reference. For example, suppose the computer system identifier negotiation protocol processes 220-1 and 220-2 are configured to reserve gateway interface (150-1) port number 2000 in cases where load sharing of requests for a web page is allowed. Further suppose that web page 128 in FIG. 1 is accessible to, and can be served from all of the internal network server computer systems 120 through 124. Perhaps each server 120 through 124 has a local identical copy of web page 128. Thus, it makes no difference if server 120, server 122 or server 124 handles a request to serve the web page 128. As such, in the example if FIG. 2 where the ALG reference translator 160-4 translates the reference 184-1 in the URL 180-1 for web page 128 ("PAGE-128"), it need not specifically obtain a port number for SERVER-A, as specified in the reference 184-1. Instead, if the ALG reference translator is aware that web page 128 is available on all servers 120 through 124 in the web site, then requests for this page 128 can be load shared and the ALG reference translator can specify port 2000 instead of port 6001 in the translated request. This has the effect of making the translated URL 180-2 to appear as "HTTP://104.0.0.1:2000/PAGE-128." Since port 2000 in the gateway interface 150-1 is specified in this URL, when a request for page 128 based on this URL arrives at the gateway computer system 150 from one of the clients 110 through 114, the gateway computer system 150 understands that port 2000 allows the request to be forwarded in a packet 322 to any server computer system 120 through 124 in the web site internal network 102. In this manner, the invention can either indicate that a translated reference is to be load shared or not by selectively choosing the computer system identifier for the translated reference.

While this invention has been particularly shown and described with references to preferred embodiments thereof, it will be understood by those skilled in the art that various changes in form and details may be made therein without departing from the spirit and scope of the invention as defined by the appended claims.

By way of example, the external and internal networks 101 and 102 need not be the Internet and a LAN. Instead, they may be any type of computer network arrangement having any number of computer systems attached thereto. The gateway computer system 150 can be a router, switch, gateway, or any other type of computer system that can interconnect the two networks 101 and 102. There may be more than one gateway computer system coupling the two networks (or any number of networks) and there may be more than one gateway network interface 150-1 that is available (i.e., advertised) on multiple networks. The client and server computer systems 110 through 112 and 120 through 124 can be any type of computer system such as a personal computer, workstation, server, mainframe, dedicated computer, or the like.

According to other alternative configurations, the system of the invention is not limited to translating references contained within web pages or to portions of data transferred between computer systems using the HTTP protocol. Rather, the invention is intended to be generally applicable to any portions of data which are exchanged between computer systems on one network that are associated with a first domain of addresses or references and computer systems on one or more other networks that are associated with different domains of addresses or references. To this end, the invention is generally able to detect computer system references within portions of data used by any type of software application and is then able to translate those references to according to the general techniques explained above such that the translated references do not reveal the identity of the original references which were translated. In this manner, a pre-existing or legacy application which currently exists only on an intranet or private network can be easily migrated using the techniques of the invention to be available on another network such as the Internet without having to specifically in manually modify references throughout the application data to be compatible with the other networks. Such legacy applications are not restricted to web pages or World Wide Web based application data. Instead, any portions of data used by any applications which contain references such as hostnames or network addresses of computer systems on an internal, private or a first network can be translated using the techniques explained above into translated references which are usable on a second network.

It is also to be understood that while the reference translation data structure 210 discussed in these examples is illustrative of information (e.g., port numbers, addresses, hostnames, etc.) maintained by the system of the invention, this reference translation data structure 210 may be a table, database, data structure or other entity that can be synchronized with a network address translation (NAT) or network address port translation (NAPT) tables that the gateway computer system maintains during the use of conventional NAT or NAPT (or twice NAPT) techniques. In other words, the gateway computer system 150 may provide conventional NAT or NAPT or twice-NAPT functionality and the invention may exist in the gateway 150 in addition to such functionality and may have access to information provided by such conventional technologies as needed for use as explained herein.

Those skilled in the art will appreciate that other variations of the invention are also possible. For example, the flow charts of processing steps as explained above described processing events in certain sequences. It is to be understood that modifications to the order of these processing steps is possible while still achieving the objectives of the system of the invention. Such variations are intended to be covered by the scope of this invention. As such, the foregoing description of embodiments of the invention are not intended to be limiting. Rather, any limitations to embodiments of the invention are presented in the claims that follow Appendix A.

APPENDIX A

The following appendix entitled "HTTP Application Level Gateway for Load Sharing Twice-Network Address Port Translation (LS t-NAPT) Environment" provides a detailed explanation of the operation of an example embodiment of the invention and is meant to be considered as part of the detailed disclosure of embodiments of this invention. This embodiment however is to be considered as an example only, and it is to be understood that this example is not meant to be limiting of the invention.

Balaji Venkat,
S.Shankar,
Kaushik Narayan,
N.Manokar,
HCL-Technologies India Pvt. Ltd,
HCL-CISCO Offshore Development Center,
Chennai,
India.

HTTP Application Level Gateway for Load Shared
Twice-Network Address Port Translation (LS T-NAPT)
Environment Abstract This draft presents a methodology to be followed for an Application Level Gateway component for HTTP to be incorporated in Load shared Network Address Port Translation environment. The outbound application data stream in the case of incoming HTTP session requests from an external realm may have to be modified in order to prevent references in the data stream that contain host names/IP addresses that are private, in the routing realm on the inside of the LS T-NAPT, from reaching the external realm. The ALG suggested translates such references to statically/dynamically assigned port identifiers on the LS T-NAPT. The ALG component will reside on each web server hosting station in the internal realm. Another component will be embedded in the NAT. This is to be done without the LS T-NAPT examining the transport payload.

Table of Contents

1. Introduction
2. Terminology
3. Load Shared Twice-Network Address Port Translation
4. Application Level Gateway for HTTP Inbound sessions
4.1 What breaks HTTP in NAT
4.1.1 Reference to a host name (DNS resolved internally)
4.1.2 Reference to an Internet Address relevant in the private realm only
4.1.3 Translating Internal References (Host names and Internet Addresses)
4.2 Dynamic Assignment of  LS T-NAPT ports for translation
4.2.1 Load Sharing (LS) range
4.2.2 Pre-emption of Load Sharing (PLS) range A
4.2.3 Pre-emption of Load Sharing (PLS) range B
4.3 Address Translation Scenarios
4.3.1.1 Inbound Address Translation in Load sharing
4.3.1.2 Outbound Address Translation in Load Sharing
4.3.1.3 Inbound Address Translation in Load sharing Avoidance
4.3.1.4 Outbound Address Translation in Load sharing Avoidance 4.4 Private Realm DNS resolution
4.5 Simple Port Negotiation Protocol (SPNP)
4.5.1 Purpose
4.5.2 Protocol Data Units (Format)
4.5.2.1 Port request SPNP Protocol data unit
4.5.2.2 Port response SPNP Protocol data unit
4.5.2.3 Port release SPNP Protocol data unit
4.5.2.3.1 Port release response SPNP protocol data unit.
4.5.2.4 Port status SPNP Protocol data unit
4.5.2.4.1 Port status response SPNP Protocol data unit (0x20)
4.5.3 Expiry of tuple entries
4.6 Handling HTTP Sessions
4.6.1 Initial setup
4.6.2 Detecting start of session
4.6.3 Detecting end of session
4.7 Application requirements
4.7.1 ALG component on the LS T-NAPT
4.7.2 ALG component on the web server.
4.7.2.1 Parsing the References to internal realm addresses/names
4.8 Heuristics for.....
4.9 Security issues
5. References
6. Author's Address 1. Introduction This draft presents a methodology to be followed for an Application
   Level Gateway for HTTP component to be incorporated in
   Load Shared Network Address port Translation environment. Migrating
   the HTTP web pages in a non-LSNAT environment to one in a LSNAT
   environment would require certain guidelines to be followed. These
   guidelines recommend host names relevant to a private realm on the
   inside of a LSNAT, and Internet addresses that refer to a host in the
   private realm, not be used in the application data stream of HTTP
   connections. In other words, HTTP pages present on the Load sharing
   private realm servers should not contain references as listed above.
   This draft aims to provide an Application Level Gateway component to
   obviate the need to follow such guidelines. Rework of web pages
   migrating to a LS T-NAPT environment with regard to changing such
   references would mean adjusting the position of the repositories of
   data that are contained in specific secondary storage areas in a host
   which are not replicated. Such containment of certain data
   (certain http objects) to a specific host may be done for
   administrative reasons. Migrating this environment to one that suits
   traditional LSNAT would cause a sea change in the way such data is
   stored and accessed.

To obviate the need for such re-work this draft intends to suggest a
   method by which references in the outbound application data stream are translated/converted so that the hosts in the external realm, in
other words the clients, can access these specified HTTP data pages
transparently, without having to use such references to hosts within
a private realm, which may not be routable to the private realm on
the inside of the LSNAT router.

The conversion of such private references is sought to be done
using DNS translation of host names that are to be internally
resolved , which are part of the application data stream,
and which are private to a realm on the inside of a
LS T-NAPT router, and mapping the corresponding Internet
addresses to specific ports on the LS T-NAPT router, whose
one to one correspondence to such hosts are statically/dynamically
configured. This static/dynamic configuration would be done on the
LS T-NAPT router with which the HTTP application level gateway
as a component of the web server will communicate and negotiate
dynamically if necessary for specific ports to be assigned.

The draft suggests a method by which such a one to one mapping
of the Internet hosts to a specific port on the LS T-NAPT may
be done dynamically. In the case of direct references to Internet
addresses in the HTTP data stream, the DNS lookup is obviated.
Further, caching in the case of DNS resolution of host name
references internal to a private realm would prevent the need for
going to the internal DNS server of the private realm every time
such a situation is encountered.

The draft also deals with the advantages that are obvious in the case
of having such a ALG component in the web server and a corresponding
component on the LS T-NAPT router. The flexibility of this scheme is
that one can migrate existing private networks as it were with hosts
having web servers, directly into a situation where they can be hosts
with web servers for external realm access, without reassigning
addresses.

The draft also addresses issues related to HTTP session based
transactions in the context of LS T-NAPT enviroments. It suggests
a method by which load sharing avoidance would be enabled in case
of such HTTP session based transactions.

It is assumed that the initial URL to the load shared web server
farm is devoid of any internal references, which goes without
saying.

2. Terminology 2.1. Address realm or realm

An address realm is a network domain in which the network addresses
are uniquely assigned to entities such that datagrams can be routed
to them. Routing protocols used within the network domain are responsible for finding routes to entities given their network addresses.

2.2. Transparent routing

The term "transparent routing" is used throughout the document to identify the routing functionality that a NAT device provides. This is different from the routing functionality provided by a traditional router device in that a traditional router routes packets within a single address realm.

Transparent routing refers to routing a datagram between disparate address realms, by modifying address contents in the IP header to be valid in the address realm into which the datagram is routed. Section 3.2 has a detailed description of transparent routing.

2.3. Session flow vs. Packet flow

Connection or session flows are different from packet flows. A session flow indicates the direction in which the session was initiated with reference to a network interface. Packet flow is the direction in which the packet has traveled with reference to a network interface. Take for example, an outbound telnet session. The telnet session consists of packet flows in both inbound and outbound directions. Outbound telnet packets carry terminal keystrokes and inbound telnet packets carry screen displays from the telnet server.

For purposes of discussion in this document, a session is defined as the set of traffic that is managed as a unit for translation. HTTP sessions are uniquely identified by the tuple of (source IP address, source TCP port, target IP address, target TCP port). ICMP query sessions are identified by the tuple of (source IP address, ICMP query ID, target IP address).

Address translations performed by NAT are session based and would include translation of incoming as well as outgoing packets belonging to that session. Session direction is identified by the direction of the first packet of that session (see sec 2.5).

According to RFC 2663...

"Note, there is no guarantee that the idea of a session, determined as above by NAT, will coincide with the application's idea of a session. An application might view a bundle of sessions (as viewed by NAT) as a single session and might not even view its communication with its peers as a session. Not all applications are guaranteed to work across realms, even with an ALG (defined below in section 2.9) enroute.". For the purpose of HTTP sessions that are identified by HTTP session Identifiers, this document supplies a mechanism by which a bundle of sessions (or connections) are treated as one session by the HTTP ALG on the NAT.

2.4. TU ports, Server ports, Client ports

According to RFC 2663...

"For the reminder of this document, we will refer TCP/UDP ports associated with an IP address simply as "TU ports".

For most TCP/IP hosts, TU port range 0-1023 is used by servers listening for incoming connections. Clients trying to initiate a connection typically select a source TU port in the range of 1024-65535. However, this convention is not universal and not always followed. Some client stations initiate connections using a source TU port number in the range of 0-1023, and there are servers listening on TU port numbers in the range of 1024-65535.

A list of assigned TU port services may be found in RFC 1700 [Ref 2]."

2.5. Start of session for TCP

The first packet of every TCP session tries to establish a session and contains connection startup information. The first packet of a TCP session may be recognized by the presence of SYN bit and absence of ACK bit in the TCP flags. All TCP packets, with the exception of the first packet, must have the ACK bit set.

2.6. End of session for TCP

The end of a TCP session is detected when FIN is acknowledged by both halves of the session or when either half receives a segment with the RST bit in TCP flags field. However, because it is impossible for a NAT device to know whether the packets it sees will actually be delivered to the destination (they may be dropped between the NAT device and the destination), the NAT device cannot safely assume that the segments containing FINs or SYNs will be the last packets of the session (i.e., there could be retransmissions). Consequently, a session can be assumed to have been terminated only after a period of 4 minutes subsequent to this detection. The need for this extended wait period is described in RFC 793 [Ref 7], which suggests a TIME-WAIT duration of 2 * MSL (Maximum Segment Lifetime) or 4 minutes.

Note that it is also possible for a TCP connection to terminate without the NAT device becoming aware of the event (e.g., in the case where one or both peers reboot). Consequently, garbage collection is necessary on NAT devices to clean up unused state about TCP sessions that no longer exist. However, it is not possible in the general case to distinguish between connections that have been idle for an extended period of time from those that no longer exist.

Many heuristic approaches are used to terminate sessions. You can make the assumption that TCP sessions that have not been used for say, 24 hours.

Another way to handle session terminations is to timestamp entries and keep them as long as possible and retire the longest idle session when it becomes necessary.

2.7. Public/Global/External network/realm.

A Global or Public Network is an address realm with unique network addresses assigned by Internet Assigned Numbers Authority (IANA) or an equivalent address registry. This network is also referred as External network during NAT discussions.

2.8. Internal/Private/Local network/realm.

A private network is an address realm independent of external network addresses. Private network may also be referred alternately as Local Network. Transparent routing between hosts in private realm and external realm is facilitated by a NAT router.

RFC 1918 [Ref 3] has recommendations on address space allocation for private networks. Internet Assigned Numbers Authority (IANA) has three blocks of IP address space, namely 10/8, 172.16/12, and 192.168/16 set aside for private internets. In pre-CIDR notation, the first block is nothing but a single class A network number, while the second block is a set of 16 contiguous class B networks, and the third block is a set of 256 contiguous class C networks.

An organization that decides to use IP addresses in the address space defined above can do so without coordination with IANA or any other Internet registry such as APNIC, RIPE and ARIN. The address space can thus be used privately by many independent organizations at the same time. However, if those independent organizations later decide they wish to communicate with each other or the public Internet, they will either have to renumber their networks or enable NAT on their border routers.

2.9. Application Level gateway (ALG)

Not all applications lend themselves easily to translation by NAT devices; especially those that include IP addresses and TCP/UDP ports in the payload. Application Level Gateways (ALGs) are application specific translation agents that allow an application on a host in one address realm to connect to its counterpart running on a host in different realm transparently. An ALG may interact with NAT to set up state, use NAT state information, modify application specific payload and perform whatever else is necessary to get the application running across disparate address realms.

According to RFC 2663...

"ALGs may not always utilize NAT state information. They may glean application payload and simply notify NAT to add additional state information in some cases. ALGs are similar to Proxies, in that, both ALGs and proxies facilitate Application specific communication between clients and servers. Proxies use a special protocol to communicate with proxy clients and relay client data to servers and vice versa. Unlike Proxies, ALGs do not use a special protocol to communicate with application clients and do not require changes to application clients.". This document requires a change on the application servers (in this case the Web Server running on a host in the internal realm), in this case the HTTP ALG component that is to be integrated on the web server and a few properties file that goes with it. It however requires no changes to the application clients, in this case a web browser.

3. Load Shared Twice-Network Address Port Translation

This is a combination of network addresses port translator and a Twice NAT that does load sharing.

4. Application Level Gateway for HTTP Inbound sessions

HTTP is very well suited for load shared Network Address port translation. Companies hosting web sites may require such load sharing especially during peak hours. Clients on the other side of the LS T-NAPT can transparently access the URLs of the web sites hosted within a private realm without having to know which private realm server is servicing their request.

Using the various load sharing algorithms suggested in RFC 2391 [1], the incoming TCP connections to the web sites hosted, can be mapped to one of the available servers and data transferred. In light of the fact that address shortage in IPv4 has increased over the last few years, the significance of LS T-NAPT becomes more relevant. In the light of the increasing usage of HTTP to get to information across the internet, the relevance of load sharing for web site hosting companies and consequently LS T-NAPT is increased. The outbound payload in the TCP packets contains information that cannot be directly sent to the client in the external realm. It may contain references to host names that are resolvable only within the private realm, or Internet addresses that are relevant only within the routing realm on the inside of the LS T-NAPT. Consequently these references need modification. There arises the need for the Application Level Gateway or ALG for HTTP. This component as per this draft is sought to be placed within the web server itself. Another corresponding component that does the static/ dynamic allocation of port numbers on the LS T-NAPT in conjunction with the ALG on the web server, is sought to be placed on the LS T-NAPT router.

4.1 What breaks HTTP in NAT (X) Please refer to NAT Application guidelines.

4.1.1 Reference to a host name (DNS resolved internally)

The HTTP pages may contain references to host names that are within a private DNS domain. Consider a scenario where there exist multiple servers as in figure 1.0 on the inside of a LSNAT router, each with a replicated repository of HTML pages and other HTTP objects. A situation that obviate the need for conversion, would contain no URLs with such references. This would mean that all data including images, audio files and HTML pages or any other HTTP object are replicated on all servers. All URLs within such pages would contain the externally advertised host name which may correspond to the external interface of a LSNAT router. This is a very ideal situation to expect.

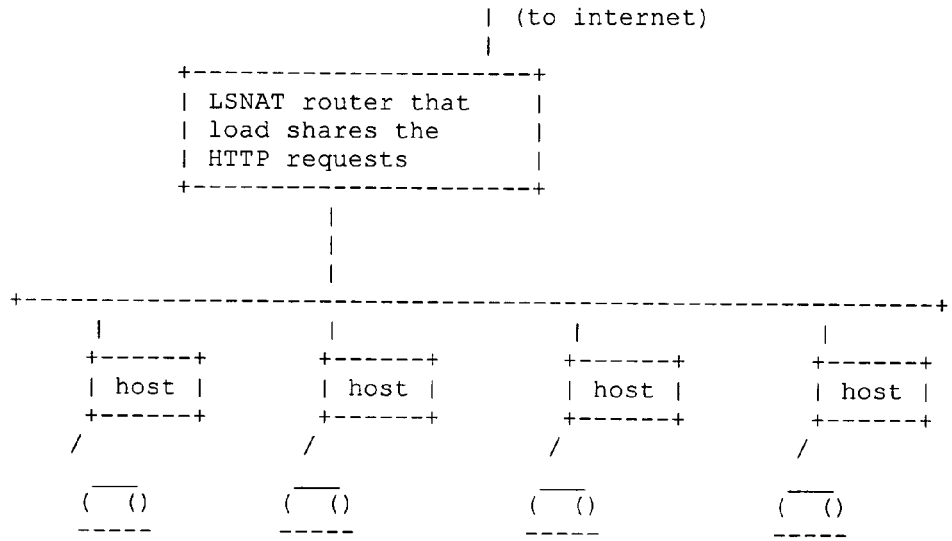

Figure 1.0 Total Data Replication with HTTP servers on the inside of a LSNAT

There may arise a reason to locate certain instances of HTTP objects in certain specific servers in the private realm. This is an issue of independence from constraints imposed, hence would be a more realistic situation. In such cases the URLs to such HTTP objects would contain host names that are private in terms of being DNS resolvable, within the realm of the servers or just private IP addresses. Figure 2.0 illustrates a situation where the server farm is divided into hosts containing replicated HTTP data as well as data restricted to specific hosts. The mapping of certain type of HTTP objects to specific hosts would be done for various reasons as seen fit by the administrator of the server farm, to facilitate better
management or restriction of such data to compartments that need to
be secure (security reasons). It may be argued that such data can
rather be kept on NFS mounted partitions so such specific assignment
of HTTP objects to particular hosts can be avoided, hence avoiding
translation, since the access can be done through any host in the
server farm to such data. Such an NFS scenario would in fact obviate
the need for such internal references but in that case you would still
need to modify the HTML source to change links appropriately. The
draft provides a means by which a set of non replicated servers with
internal references can directly migrate to a LS T-NAPT enviornment
without any change to HTML code base.

The non-replication decision would be based on factors such as space
occupied by certain instances of HTTP objects. It would indeed be
optimal to have this sort of data not replicated as such replication
would lead to enormous space occupied on the replicated servers. This
is an significant reason why such replication is precluded for
certain type of HTTP objects. File size may thus count as a reason
in such a decision.

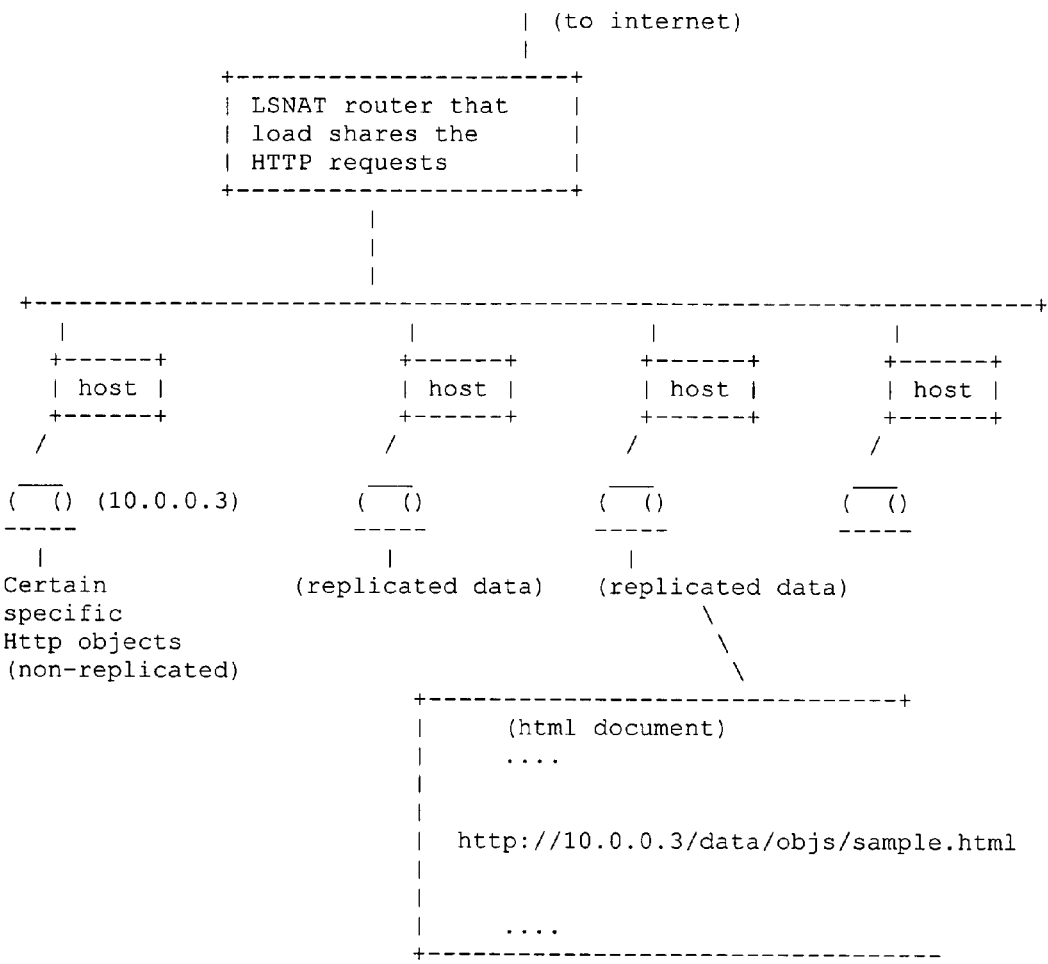

Figure 2.0 Partial Data Replication with HTTP servers on the inside of a LSNAT

In the case of certain HTTP objects being accessible through specific hosts, the HTML objects in the replicated data on the servers, or for that matter those pages within the non-replicated secondary storages within specific hosts, can contain references to host names which are DNS resolvable only within the private realm, or contain references in the form of IP addresses applicable within the private realm, as in the following cases. Figure 3.0 illustrates a usage (within a HTML page) referring to a URL for a html file. It may be that in this case the consideration was to restrict certain html files to a specific host.

```
<HTML>
              .
              .       +------internally resolved name
              .       |
<     http://xyz.internal.com/data1/xyz.html    >
```

Taking the example in Figure 2.0 where there may exist realm
internally resolvable host names, a specific host say 10.0.0.3 may
assigned the host name xyz. DNS resolution for this host name is
internal to the realm and sending this HTML source as an outbound
stream to the external realm would cause such a URL to be useless
outside its scope. The name xyz.internal.com outside of the private
realm is non-routable. Such a reference needs to be translated.

4.1.2 Reference to an Internet Address relevant in the private
      realm only

In the case of certain HTTP objects being accessible only through
specific hosts in the server farm, the HTML objects in the replicated
data servers, or for that matter HTML objects/pages within the
non-replicated portion of secondary storages in certain hosts, may
contain an Internet Address that is relevant only in the private
realm. Figure 4.0 illustrates just such an example.

```
<HTML>

..
   <  http://10.0.0.3/data1/xyz.html    >
```

Taking the example of Figure 2.0 certain html files may be isolated
to the host 10.0.0.3. Thus such a reference would be non-routable
from an external realm if this source were to be shipped to the
client in the external realm without translation. Such a reference
needs to be translated.

4.1.3 Translating Internal References (Host names and Internet Addresses)

Given the above two situations that may occur in the outbound
application data stream for HTTP, there is a necessity to translate/
convert these references to a host name/Internet address that is
routable from the external realm. The external address to which such
a reference needs to be translated to is normally the advertised
interface of the LS T-NAPT. Consider a situation where this
internal reference is translated to the external address of the LS
Twice-NAPT and nothing more is done, then when the client requests a
connection to the external address of LS T-NAPT, in case the user
on the external realm client were to use the URL thus translated in
the HTML page, there is no guarantee that such a request is routed
to the host that was originally mentioned in the URL. Hence such a
request may be load shared again which is incorrect. The original HTML stream contained a reference to a specific host in the private realm and load sharing such a request would lead to the request being funnelled to a host which is not the same host that was specified in the URL. To overcome this problem, a group of ports which may be statically/dynamically configured on the LS T-NAPT are used to assign a one to one mapping between a host in the private realm and its HTTP port on the one hand, and a particular port in this statically/dynamically configured range. The LS T-NAPT CAN allow static configuration of a series of ports (that may be within a range or be discontiguous) to the HTTP port of each host in the server farm. There would be a tuple as in (Host server internal IP address which is referred to in the URL, HTTP port (80) or specified port in the original URL, LS Twice-NAPT port,Internal realm host hosting the page containing the URL). HTTP connection requests for specific hosts that are not to be load shared can be directed to that host by looking up a table of such tuples. Dynamic allocation of such ports is discussed in section 4.2.

Static configuration of ports is not handled in this draft. Port RANGES may however be statically configured for dynamic allocation on a port by port basis within such a range. In case specific ports are mentioned in the internal URL (to be translated), this specified port number is taken into account in the tuple instead of the default port number (80). Dynamic configuration of port ranges is not handled in this draft.

Using this tuple the translation in the application data stream can be done as follows. Take the example of a specific reference to a hostname or Internet address internal to a private realm as in Figure 2.0. The steps to resolve this reference would be as follows.

On the ALG component on the web server :-

1) Resolve the host name through realm internal DNS resolution and obtain private realm specific IP address of host.
2) Look up tuple table to see if there exists an entry for (Host IP address, HTTP port (80),LS T-NAPT port). If there exists none, then using dynamic assignment of ports the ALG component residing as a plug in on the web server and a corresponding component on the LS T-NAPT would negotiate a port to be used. It goes without saying that the ALG component would maintain a tuple table which is replicated on the corresponding NAT component as well. The tuple on the ALG component on the web server, would exclude the internal realm host hosting the web page, which would be the host maintaining the tuple itself.

A propreitary protocol for port negotiation is discussed in detail in section 4.5.

3) Generate a URL using external address of LS T-NAPT with LS T-NAPT port number looked up in step 2.

This method can be applied where static configuration of such port RANGES on the LS T-NAPT is done. Where Dynamic assigment is used, a range of ports can be specified and on the first translation effort undertaken on the outbound data stream, a port in the range can be assigned. In this case, the steps would be as follows.

On the ALG component on the web server :-

1) Resolve the host name through realm internal DNS resolution and obtain private realm specific IP address of host.
2) Look up tuple table to see if there exists an entry for (Host IP address, HTTP port, LS T-NAPT port). If there exists none, create an entry and assign a port in a specified range that may be dynamically configured after negotiation with the NAT component.
3) Generate a URL using external address of LS T-NAPT with LS T-NAPT port number negotiated in step 2.

In case of translating IP addresses in the outbound data stream step (1) in both cases is avoided. A direct lookup of the tuple table would give the required LS T-NAPT port.

(a) Original HTTP stream

<HTML>

```
           <      http://xyz/data1/xyz.html      >
```

(b) Translated HTTP stream

<HTML>

```
           <   http://171.89.90.2:6001/data1/xyz.html   >
                         ^        ^
                         |        |
                         |        +-------- Assigned LS T-NAPT
                         |                  port in the tuple
                         |                  statically or
                         |                  dynamically assigned
                         |
                         +-------External address (advertised)
                                 of the LS T-NAPT router
```

Figure 5.0 (a) and (b) shows the original HTTP stream and the translated stream.

The translated HTTP stream would thus contain the externally advertised address of the LS T-NAPT and a port number that is assigned
for pre-empting load sharing in this case.

So when a HTTP connection request comes in with no port references or
specific reference to port 80 of the LS T-NAPT external address, it
would load share the request to any of the servers in the server farm.
If however there exists a specific port reference in the HTTP
connection request, which is obviously other than 80, the NAT ALG
component would look up the tuple table and use the corresponding IP
address of the host in the tuple. Thus (external realm client IP
address, source port, LS T-NAPT external interface address, specific
destination port) would be translated after tuple table lookup to
(LS T-NAPT external interface address, assigned source port on
LS T-NAPT, host in server farm for which connection is intended,
HTTP port (80)). This assumes that the external address of the
LS T-NAPT is routable within the private realm. If not the address
on internal realm side of the LS T-NAPT is used.

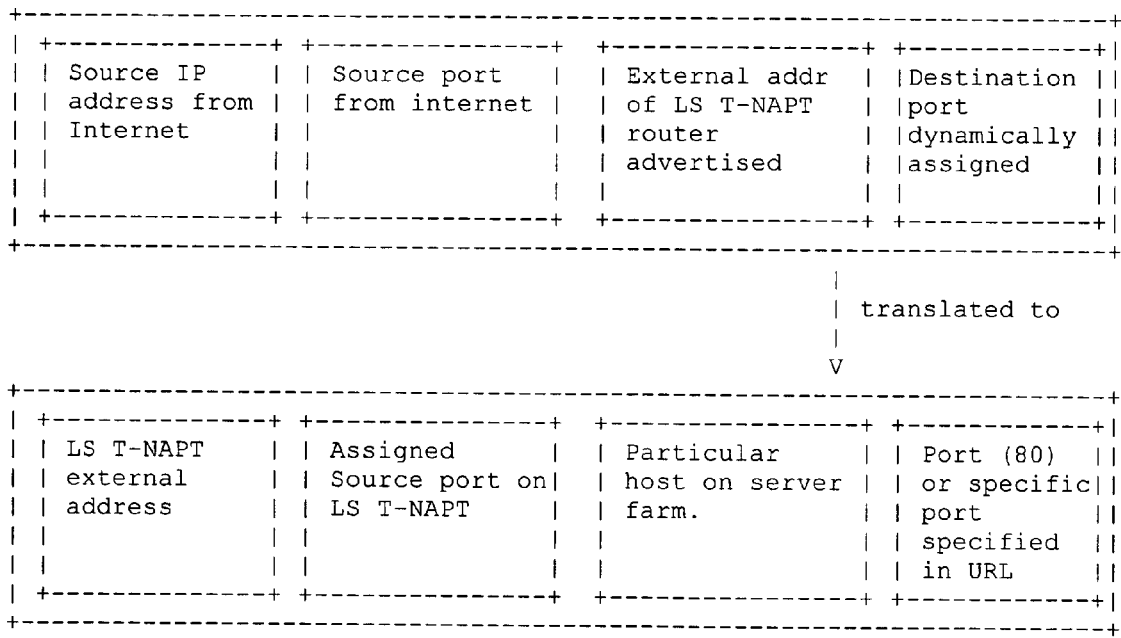

Figure 6.0  Inbound Address translation in pre-emption of load
sharing example.

The range of addresses used for the assigned source port in LS T-NAPT
for traffic internal to private realm in this case may be different
from the range used in Load sharing case.

4.2 Dynamic Assignment of LS T-NAPT ports for translation

There can be ranges of ports on the LS T-NAPT which are used for Load
sharing, pre-emption of load sharing which may be statically
configured.

4.2.1 Load Sharing (LS) range

In case of Load sharing, there could be the LS range which can be
statically configured on the LS T-NAPT. This range of ports are used for
normal load sharing LS T-NAPT functionality. Ports from this range are
used by the LS T-NAPT router for talking to the hosts on the server farm
when HTTP connections to port 80 are addressed to the LS T-NAPT external
interface.

4.2.2 Pre-emption of Load Sharing (PLS) range A

In case of pre-emption of Load sharing, there could be PLS range A
which can be statically configured on the LS T-NAPT. This range of ports
are used for load sharing avoidance in LS T-NAPT. Ports from this range
are used by external clients to talk to the LS T-NAPT router when HTTP
connections to specific hosts on the server farm are to be addressed
to the LS T-NAPT external interface.

4.2.3 Pre-emption of Load Sharing (PLS) range B

In case of pre-emption of Load sharing, there could be PLS range B
which can be statically configured on the LS T-NAPT. This range of
ports are used for load sharing avoidance in LS T-NAPT. Ports
from this range are used by LS T-NAPT router for talking to the hosts
on the server farm when HTTP connections to specific ports in the PLS
range A are addressed to the LS T-NAPT external interface.

4.3 Address Translation Scenarios

Consider the Figure 8.0 which illustrates a LS T-NAPT setup for load
sharing multiple servers providing HTTP server access to external
clients.

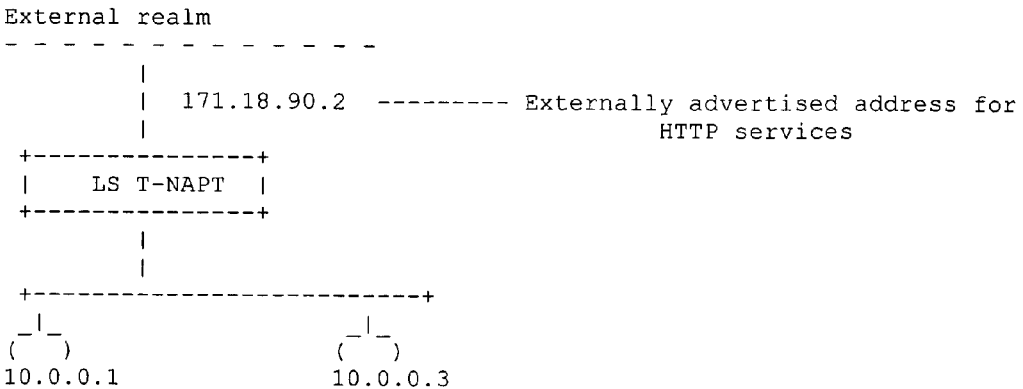

4.3.1.1 Inbound Address Translation in Load sharing

Consider a request for HTTP services from an external host 145.89.29.1. The destination address for this request is of the external address of the LS T-NAPT router and the destination port being the usual 80 (standard HTTP port). When this request is received, the LS T-NAPT translates the client address and TU port to Address of the LS T-NAPT (externally advertised) and a port from LS Range. The LS T-NAPT also translates the destination address from the external address of the LS T-NAPT to the address of the host to which the connection is to be forwarded based on the load sharing decision made at the time of the SYN segment reception for that connection. The TCP and IP header checksums are recomputed.

```
V S=145.89.29.1, p=3000
V D=171.18.90.2, p=80
  |
  |  171.18.90.2
+---------------+
|    LS T-NAPT  |
+---------------+
  |
  |  V S=171.18.90.2,p=7001 ----> from LS range
  |  V D=10.0.0.3, p=80
+-------------------------------+
    _|_                    _|_
   (   )                  (   )
   10.0.0.1               10.0.0.3
```

4.3.1.2 Outbound Address Translation in Load Sharing

The outbound translation would be in the form of (a) HTTP stream translation at ALG component of web server.
(b) TCP/IP Header address translation at LS T-NAPT.

(a) HTTP stream translation at ALG component of web server

It is to be noted that such translation /conversion by the ALG component on the web server would result in files that are bigger and sometimes smaller than the original files resident on the source. The methods for handling this delta between input HTTP stream and converted HTTP stream as a web server plugin mechanism are left as a matter of further enquiry.

(TBD) This is a part that needs elaboration. about Stream translation.

(b) TCP/IP Header address translation at LS T-NAPT

The LS T-NAPT translates the source address from that of the private
realm host's address to the external address of the LS T-NAPT. The
LS T-NAPT also translates the Destination address and port from that of
the (external address of the LS T-NAPT, address in the LS range) to the
(address of the host external realm, source port of host in external
realm). The TCP and IP header checksums are recomputed. The TCP and
IP header checksums are recomputed.

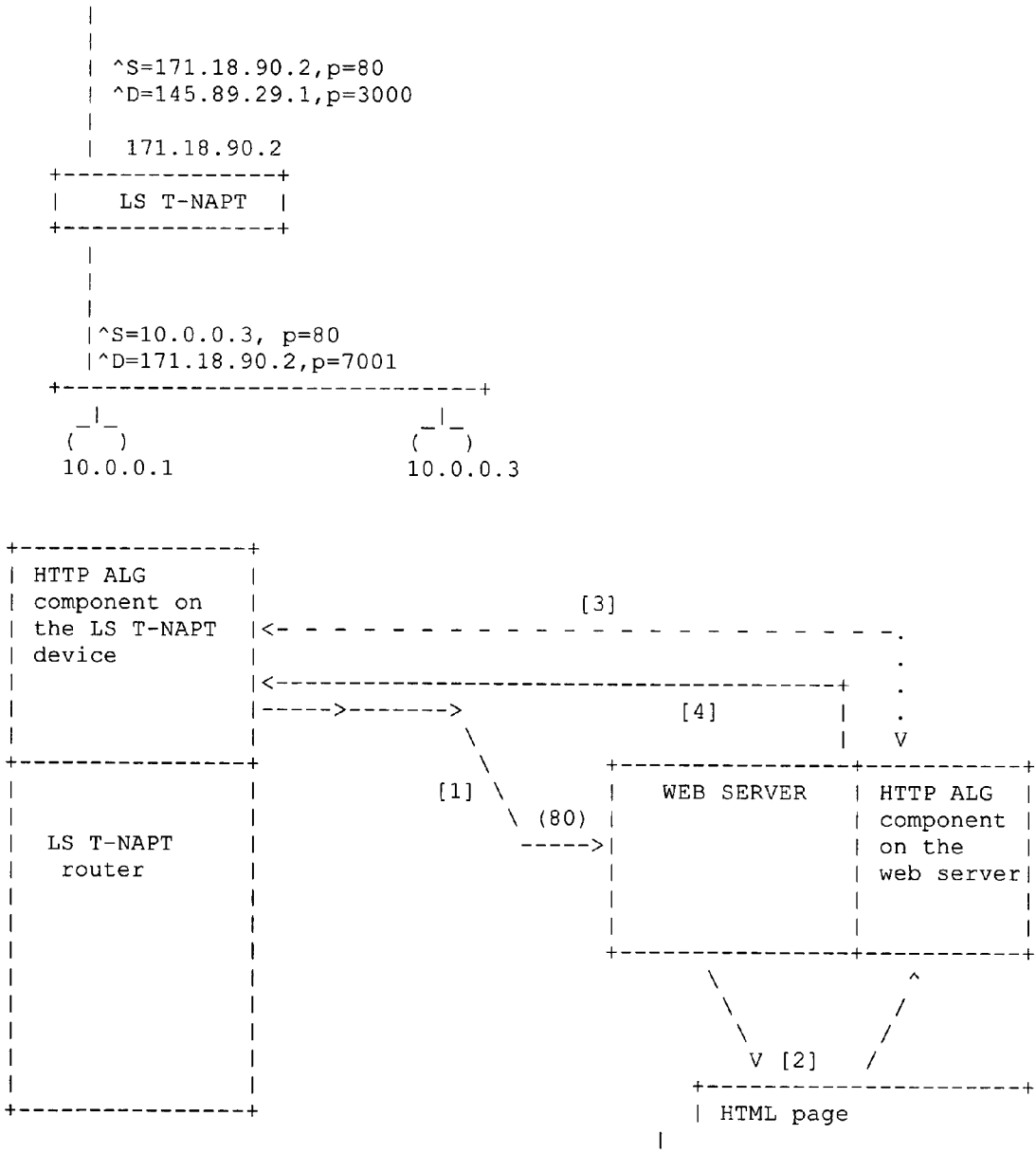

```
   |
   |
   | ^S=171.18.90.2,p=80
   | ^D=145.89.29.1,p=3000
   |
   |   171.18.90.2
 +----------------+
 |   LS T-NAPT    |
 +----------------+
   |
   |
   |
   |^S=10.0.0.3, p=80
   |^D=171.18.90.2,p=7001
 +-----------------------------+
    _|_                   _|_
   (   )                 (   )
   10.0.0.1              10.0.0.3

+----------------+
| HTTP ALG       |
| component on   |            [3]
| the LS T-NAPT  |<- - - - - - - - - - - - - - - - -.
| device         |                                  .
|                |<--------------------------------+.
|                |----->------->      [4]          |.
|                |              \                  | V
+----------------+               \   +-------------+------------+
|                |                \  | WEB SERVER  | HTTP ALG   |
|                |            [1]  \ |             | component  |
| LS T-NAPT      |              \ (80)|            | on the     |
| router         |               ---->|            | web server |
|                |                   |             |            |
|                |                   |             |            |
|                |                   +-------------+------------+
|                |                            \          ^
|                |                             \        /
|                |                              \      /
|                |                             V [2]  /
|                |                              +------------------+
|                |                              | HTML page
+----------------+                              |
```

[1] Load shared request for HTML page to port 80.
[2] Transfer of HTML page contents to HTTP ALG component.
[3] Possible DNS resolution of internal names and Simple port negotiation with the HTTP ALG component on the LS T-NAPT device.
[4] Translated output stream from ALG component on web server to intended destination in the external realm.

4.3.1.3 Inbound Address Translation in Load sharing Avoidance

Once the application data stream has been modified in cases where load sharing sharing should be avoided as discussed in Section 4.2, the LS T-NAPT router may receive requests from external clients with the source port being addressed in the PLS range A. Consider the Source HTTP stream and translated HTTP stream in Figure 7.0. This would require the LS T-NAPT to do the following translation. The LS T-NAPT router would translate the Source address (of the external client) and TU port to the external address of the LS T-NAPT and a specified port in PLS range B which may have been dynamically allocated. The LS T-NAPT router would also translate the Destination address (external address of LS T-NAPT router) and destination port (in address range PLS range A) to the address of the host in the private realm (corresponding to the port in PLS range A) and port 80 or specific port as may have been in the original URL.

(a) Original HTTP stream during outbound before being read by the ALG component on the web server.

<HTML>

<    http://xyz.internal.com/data1/xyz.html    >

(b) Translated HTTP stream during outbound after negotiation for port allocation and consequent translation by the ALG component on the web server.

<HTML>

```
        <   http://lsnapt.xyz.com:6001/data1/xyz.html  >
                  ^            ^
                  |            |
                  |            +-------- Assigned LS T-NAPT
                  |                      port in the tuple
                  |
                  +-----External address (advertised) of
                        the LS T-NAPT router
```

As a result of such a translation and consequent request by the client to such a port (when the user of the HTML page in the external client clicks his/her mouse pointer on this URL), the translation sequence would be as follows.

```
V S=145.89.29.1, p=4000
V D=171.18.90.2, p=6001
   |
   |  171.18.90.2
-------------------
|    LS T-NAPT      |
-------------------
   |
   |  V S=171.18.90.2,p=8001
   |  V D=10.0.0.3, p=80
   +-----------------------------+
    _|_                     _|_
   (   )                   (   )
   10.0.0.2                10.0.0.3
```

Here in order to pre-empt load sharing a suitable port in PLS range A has been assigned to the URL. It is port 6001. From then on all connections to requested to port 6001 belong to the host 10.0.0.3 in the private realm as is looked up in the Tuple table mentioned in Section 4.2.

4.3.1.4 Outbound Address Translation in Load sharing Avoidance

The outbound translation would be in the form of (a) HTTP stream translation at ALG component of the web server which includes port assignment negotiation.
(b) TCP/IP Header address translation at LS T-NAPT.

(a) HTTP stream translation at ALG component of LS T-NAPT

This has already been handled in Section 4.2. It is to be noted that such translation or conversion by the ALG component would result in files that are bigger and sometimes smaller than the files resident on the source.

(b) TCP/IP Header address translation at LS T-NAPT

The LS T-NAPT translates the source address from that of the private realm host's address and port 80 or the specific port as specified in the original URL, to the external address of the LS T-NAPT and the corresponding address in PLS range A as looked up in the Tuple table of Section 4.2. The LS T-NAPT also translates the Destination address and port from that of the (external address of the LS T-NAPT, port in PLS range B) to the (address of the host external realm, source port of host in external realm). The TCP and IP header checksums are recomputed. The TCP and IP header checksums are recomputed.

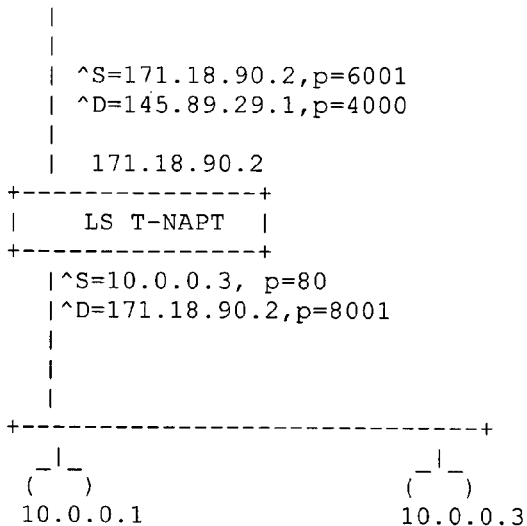

(TBD)

In the case of a specific port instead of 80 as the destination port it would be that port as specified in the original URL.

LS T-NAPT device HTTP ALG Component table

| LS T-NAPT port from PLS range A | HTTP port on internal realm server | Internal realm server IP address | Internal realm realm host with whom port negotiation was done |
|---|---|---|---|
| 6001 | 80 | 10.0.0.3 | 10.0.0.1 |
| 6002 | 2001 | 10.0.0.1 | 10.0.0.3 |

HTTP ALG component on Web Server 10.0.0.1 has the following table, in case it had an internal reference in its HTML pages to 10.0.0.3.

| HTTP port on internal realm server | LS T-NAPT port from PLS range A | Internal realm server whose reference the html page lying on the host had. |
|---|---|---|
| 80 | 6002 | 10.0.0.3 |

HTTP ALG component on Web Server 10.0.0.3 has the following table, in case it had an internal reference its HTML pages to 10.0.0.1.

| HTTP port on internal realm server | LS T-NAPT port from PLS range A | Internal realm server whose reference the html page lying on the host had. |
|---|---|---|
| 2001 | 6002 | 10.0.0.1 |

4.4 Private Realm DNS resolution

As was mentioned the host names in the HTTP data stream (URLs), may need to be DNS resolved within the private realm. For those references which are externally resolvable there need be no change at all. For those that are resolvable only internal to the private realm a DNS lookup is required. Access to the DNS records within the internal realm would help the ALG component to resolve these references through table lookup in memory rather than through a DNS query to a DNS server which may be done for the first time lookup alone. Appropriate timeout can be set for expiration of entries cached from such lookups and lookups can be redone periodically.

The resultant IP address could be cached within a table in the ALG component on the web server and further lookup prevented until the expiry of that entry.

4.5 Simple Port Negotiation Protocol (SPNP)

4.5.1 Purpose

This protocol helps in the dynamic allocation of ports on the external interface of the LS T-NAPT on demand from a requesting host having a HTTP ALG component in its web server stationed within the internal realm of an LS T-NAPT. The following section discusses the various protocol data units for this simple port negotiation protocol. At the web server end there is an ALG component that issues a port requistion request when the parser encounters an IP address/internal host name reference that needs to be resolved to the external address of the LS T-NAPT. The ALG component atop the LS T-NAPT receives such a request and replies with a port number or error whichever may be the case.

There are basically seven types of protocol data units in this Simple port negotiation protocol. It rides atop the User datagram protocol (UDP). Retransmission of lost packets may be done by the ALG components at the application layer of the ALG component software. The 4 basic types of PDUs in the protocol are 1) Port request
2) Port response
3) Port release
4) Port release response
5) Port status
6) Port status response
7) Session id grab
8) Session id grab response
9) Session id release
10) Session id release response

4.5.2 Protocol Data Units (Format)

4.5.2.1 Port request SPNP Protocol data unit

The port request SPNP protocol data unit is initiated by the ALG component on the web server when it requires a port to resolve internal IP addresses or internal host names (resolvable within the internal realm). The elements encoded in this protocol data unit are ....

(i) Request's Unique Identification number
(ii) Request type octet set to 0x1.
(iii) Data length
(iv) Internal realm IP address
(v) Internal realm destination port number specified by default as 80 or specified in the URL reference in the HTML page to be transformed.

```
 0 1 2 3 4 5 6 7 0 1 2 3 4 5 6 7
+-------------------------------+
|         request's UIN         |
+---------------+---------------+
| request_type|  data_length    |
+-------------------------------+
|   Internal Realm IP address   |
|                               |
+-------------------------------+
|   internal_realm_port         |
+-------------------------------+
```

UIN - Unique Identification Number for request
data_length - data length octet.
request_type - request type octet set to 0x1 in this case
internal_realm_port - Internal realm port destination port number
                which is 80 or specific port specified in the URL.

4.5.2.2 Port response SPNP Protocol data unit

The port response SPNP protocol data unit is initiated by the ALG component on the LS T-NAPT when it recieves a port request PDU. The elements encoded in this protocol data unit are ....
 (i)   Request's Unique Identification number as sent in the Port request PDU
 (ii)  Response type octet set to 0x2.
 (iii) Data length
 (iv)  Internal Realm IP address
 (v)   Internal Realm destination port number specified by default as 80 or specified in the URL reference in the HTML page to be transformed.
 (vi)  External address of LS T-NAPT
 (vii) Port number assigned to this port request on the external address as specified in item (vi).

```
 0 1 2 3 4 5 6 7 0 1 2 3 4 5 6 7
+-------------------------------+
|         request's UIN         |
+---------------+---------------+
| request_type|  data_length    |
+-------------------------------+
|   Internal Realm IP address   |
|                               |
+-------------------------------+
|   internal_realm_port         |
+-------------------------------+
|External address of LS T-NAPT  |
|                               |
+-------------------------------+
|   assigned_port               |
+-------------------------------+
```

UIN - Unique Identification Number for response to request
request_type - Request type octet set to 0x2 in this case
data_length - data length octet.
internal_realm_port - Internal realm port destination port number
                      which is 80 or specific port specified in the
                      URL.
assigned_port - Port number assigned for the port request.

By default, the response octet is set to 0x2 for a port request PDU
response. If it is other than 0x2 and is 0x80, then it is assumed
that an error has occured or it is a port release PDU response or an
acknowledgement for the Port Status PDU. If this is the case then the
data length is set to 2. The first 2 bytes after the data length is
the error code or the response code for the port release PDU
or the port status PDU.

```
 0 1 2 3 4 5 6 7 0 1 2 3 4 5 6 7
+-------------------------------+
|        request's UIN          |
+--------------+----------------+
| request_type|  data_length    |
+-------------------------------+
| Internal Realm IP address     |
|                               |
+-------------------------------+
| error_code                    |
+-------------------------------+
|External address of LS T-NAPT  |
|                               |
+-------------------------------+
| assigned_port                 |
+-------------------------------+
```

UIN - Unique Identification Number for response to request.
request_type - request type octet in this case set to 0x80.
data_length - data length octet
error_code - Error code specifying error condition on port request
             or response for port release PDU or port status PDU.

error_code can be any one of the following .....

0x1  - Invalid External address of the LS T-NAPT specified in the port
       request PDU
0x2  - No more port numbers available in the PLS range A.
0x4  - Port release response.
0x8  - Invalid port number in Port status request/ Port release PDU
0x10 - Valid port number in Port status request.

4.5.2.3 Port release SPNP Protocol data unit

The port release PDU can be sent either by the LS T-NAPT ALG component or by an internal realm host which had initiated a port request PDU. In the former case the port request PDU is sent in by the LS T-NAPT ALG component on the basis of whether the HTTP connection has expired. A heuristic by which this may be initiated would be the exchange of FIN packets on the related connection. In this case the port release PDU is sent to the host with whom the port request PDU was initially exchanged.

In the latter case the port release PDU is sent in by the ALG component on the web server, once it has confirmed that a port assigned by port request PDU is no longer needed. Thus the port number assignments can be expired on the ALG component of the LS T-NAPT itself or by a specific request from the ALG component on the web server.

The elements encoded in the port release PDU are....

(i)   Request's Unique Identification number
(ii)  Request type octet is set to 0x4
(iii) Data length
(iv)  Internal realm IP address.
(v)   Port number 80 or specific port specified in the URL to be transformed.
(vi)  Port number to be released which was assigned using the port request PDU. This port number and item (iii) should match the tuple on the ALG component of the LS T-NAPT.

```
 0 1 2 3 4 5 6 7 0 1 2 3 4 5 6 7
+-------------------------------+
|       request's UIN           |
+--------------+----------------+
| request_type|  data_length    |
+-------------------------------+
| Internal Realm IP address     |
|                               |
+-------------------------------+
| internal_realm_port           |
+-------------------------------+
| assigned_port                 |
+-------------------------------+
```

UIN - Unique Identification Number for request for port release
request_type - Request type octet set to 0x4 in this case.
data_length - data length octet
internal_realm_port - Internal realm port destination port number which is 80 or specific port specified in the URL.
assigned_port - Port number assigned that is to be released by the port release request.

4.5.2.3.1 Port release response SPNP protocol data unit.

For the PDU specified in the section 4.5.2.3 (the port release PDU),
   a corresponding port release response PDU is sent in by the
   respondent (the receiver of the port release PDU).

In the former case, when the LS T-NAPT ALG component sends in the
   port release PDU on the expiry of a connection, the host that had
   initiated the port request PDU in the internal realm, sends a
   port release PDU confirming that a port sought to be released
   can indeed be released. It does so after flushing out the entry
   in its tuple table.

In the latter case, the port release response PDU is sent in by
   the ALG component on the LS T-NAPT, once it has confirmed that a
   port sought to be released by the port release PDU can indeed be
   released. Once the port sought to be released is confirmed by the
   "port request PDU initiating host" or by the ALG component on the
   LS T-NAPT as a legitimate port to be released, the error_code is set
   to 0. Else a non-zero value indicates that the port could not be
   released because one of many reasons.

The elements encoded in the port release response PDU are....
   (i)    Request's unique identification number as set in the port
          release PDU sent in earlier.
   (ii)   Request type octet is set to 0x10
   (iii)  Data length
   (iv)   Internal realm IP address
   (v)    Port number 80 or specific port specified in the URL to be
          transformed.
   (vi)   Port number to be released which was sought to be released by
          the port release PDU.
   (vii)  The error code that states if the release of the port was
          successful or if there was a failure.

```
    0 1 2 3 4 5 6 7 0 1 2 3 4 5 6 7
   +-----------------------------+
   |       request's UIN         |
   +--------------+--------------+
   | request_type| data_length   |
   +-----------------------------+
   | Internal Realm IP address   |
   |                             |
   +-----------------------------+
   | internal_realm_port         |
   +-----------------------------+
   | assigned_port               |
   +-----------------------------+
   | error_code                  |
   +-----------------------------+
```

UIN - Unique identification number for request as set in the port
    release
request_type - Request type octet is set to 0x10 in this case.
data_length - data length octet in bytes
internal_realm_port - Internal realm port destination port number
                     which is 80 or specific port specified in the
                     URL.
assigned_port - Port number assigned that is to be released by the
                port release request.
error_code - error code indicating success or failure of the port
             release request.

error_code can be any one of the following....

0x0 - port release request was successful and the port was released.
0x1 - port release request was a failure as port number was invalid
      or was outside the PLS range A.
0x2 - port release request was a failure as Internal realm IP
      address did not match in any of the tuples maintained in the
      "port request PDU initiating host" or by the LS T-NAPT ALG
      component
0x4 - port release request was a failure as internal realm port
      number did not match in any of the tuples maintained in the
      "port request PDU initiating host" or by the LS T-NAPT ALG
      component.

4.5.2.4 Port status SPNP Protocol data unit

The port status PDU is sent in by the ALG component on the web
server, when it requires status information regarding a specific port
that was assigned using the port request PDU. The same status
information may also be requested by the LS T-NAPT ALG component.

The elements encoded in the port status PDU are ....

(i)   Request's Unique identification number
(ii)  Request type octet set to 0x8
(iii) Data length
(iv)  Internal realm IP address
(v)   Port number associated with the Internal realm IP address as
      sent in initially by the port request PDU.
(vi)  Port number to be affirmed with regard to its association on
      the LS T-NAPT with item (iv) and (v) specified above as it exists
      on a table on the LS T-NAPT ALG component, or the port number
      to be affirmed with regard to its association on the
      "port request PDU initiating host" with item (iv) and (v)
      specified above as it exists in the tuple table on the "port
      request PDU initiating host".

```
 0 1 2 3 4 5 6 7 0 1 2 3 4 5 6 7
+-------------------------------+
|         request's UIN         |
+---------------+---------------+
| request_type |  data_length   |
+-------------------------------+
|   Internal Realm IP address   |
|                               |
+-------------------------------+
|       internal_realm_port     |
+-------------------------------+
|         assigned_port         |
+-------------------------------+
```

UIN - Unique Identification Number for request for port release
request_type - Request type octet set to 0x8 in this case.
data_length - data length
internal_realm_port - Internal realm port destination port number
                     which is 80 or specific port specified in the
                     URL.
assigned_port - Port number to be affirmed with regard to its
                association on the ALG component on the LS T-NAPT,
                or on the "port request PDU initiating host".

4.5.2.4.1 Port status response SPNP Protocol data unit (0x20)

The port status response PDU is sent in by the ALG component on the LS T-NAPT when it acknowledges the port status PDU sent in by the ALG component on the web server. The port status response PDU can also be sent in by the "port request PDU initiating host" when it acknowledges the port status PDU sent in by the LS T-NAPT ALG component.

The error code bytes in the PDU would reflect whether the status of the port is registered in the tuples on the LS T-NAPT tuple table or in the tuple table of the "port request PDU initiating host". If it is not then the error code bytes are set appropriately as explained below.

The elements encoded in the port release response PDU are....

(i) Request's unique identification number as set in the port status PDU sent in earlier.
(ii) Request type octet is set to 0x20
(iii) Data length
(iv) Internal realm IP address
(v) Port number 80 or specific port specified in the URL to be transformed.
(vi) Port number to be queried as regards its status by the port status PDU.
(vii) The error code that states if the status of the port in the tuple table is proper or if there is a discrepancy.

```
 0 1 2 3 4 5 6 7 0 1 2 3 4 5 6 7
+-------------------------------+
|         request's UIN         |
+-------------+-----------------+
| request_type| data_length     |
+-------------------------------+
| Internal Realm IP address     |
|                               |
+-------------------------------+
| internal_realm_port           |
+-------------------------------+
| assigned_port                 |
+-------------------------------+
| error_code                    |
+-------------------------------+
``` error_code can be any one of the following....

0x0 - port status request was successful and the port is valid.
0x1 - port status request was a failure as port number was invalid
      or was outside the PLS range A.
0x2 - port status request was a failure as Internal realm IP address
      did not match in any of the tuples maintained in the LS T-NAPT ALG
      component or on the "port request PDU initiating host".
0x4 - port status request was a failure as internal realm port
      number did not match in any of the tuples maintained in the
      LS T-NAPT ALG component or on the "port request PDU initiating
      host".

4.5.3 Expiry of tuple entries

Once a load sharing pre-emption is initiated and a tuple maintained,
it may be dropped after the HTTP connection is done. The specific link
or URL with an internal reference may have to be relearned again
through SPNP negotiation. Hence caching on the clients in the external
realm is not recommended for such pages, if immediate drop of the
HTTP connection and consequently the entry in the tuple table after
connection is closed, is initiated. The idea as to how to implement
the timeout for expiry of a tuple and flushing of such tuples in the
corresponding tables is left for further enquiry.

4.6 Handling HTTP Sessions

Session based transactions in HTTP are seen in HTTP servlet
sessions and SSL sessions. Such HTTP sessions are detected
and load sharing avoidance goes into action for such sessions. The
very nature of this invention prevents a lookup into the upper layers (layer 5 and above) by the NAPT. Thus HTTP session IDs which are present in the HTTP header are not looked up by the NAPT.

4.6.1 Initial setup

When receiving a request for HTTP connection, when a load balancing decision is to be taken, first the search is done on the existing Load sharing avoidance tuple table to check if there is a need for pre-emption of load sharing if the connection was a result of an earlier load sharing avoidance tuple being set up for a HREF like entry in the HTML page. If the entry exists then the load sharing avoidance exercise goes into action, and the HTTP request is redirected to the appropriate internal realm host rather than being load shared.

4.6.2 Detecting start of session

Here is a legend for future reference....
PDU - Protocol Data Unit
SA  - Source Address
SP  - Source Port
DA  - Destination address
DP  - Destination port HTTP Servlet sessions use two mechanisms for maintaining state information about the session. Every HTTP session has a unique session ID which maintains state. Servlets typically use HTTP Cookies to set the session ID and receive it as part of every request. In cases where cookies are not supported by the client, URL rewriting is used. In both cases an Ascii text string containing the keyword "SESSIONID" is passed in the HTTP request.

When a HTTP session is initiated and initially load shared, a Search is done for "SESSIONID" on the ALG component on the web server. The keyword "SESSIONID" keyword might be vendor or user specific and is configurable from a configuration file.

In case of SSL sessions the SSLId is the session Id. The SSL ID is not encrypted and can be directly extracted from the packet by the ALG component on the webserver.

Once the session ID is extracted from the HTTP packet the following steps are taken. Step 2.a and 2.b are mutually exclusive.

1) SESSION ID Grab PDU is sent out by the ALG component on the web server.

Session id grab PDU....
   a) consists of Source port mapped within the LS T-NAPT
       in the Load Sharing range to the actual source address,
       source port in the external realm
   b) Destination IP address (address of the host in the internal
       realm).
   c) Destination port (port number [80 or alternative port]
       on the host in the internal realm).

2.a) LS T-NAPT sets up a tuple like the following in the HTTP session
   id table that prevents load balancing for requests on the
   match that is same as Source Address for incoming TCP packets...
   The tuple is SA (external realm host) ,DA (NAPT IP address) ,
   DP (NAPT port) , internal DA (internal realm host address),
   internal DP (internal realm port), HTTP SESSION ID. The SESSION
   ID start PDU is acknowledged with the SA,DA,DP, HTTP SESSION ID
   PDU also known as the SESSION ID grab response PDU. The tuple
   does not contain the external realm source port (SP), since a
   single HTTP session would be composed of multiple HTTP
   transactions and each HTTP transaction would be initiated by
   external realm source using a different ephemeral source port.
   This would mean that subsequent to the setup of a HTTP session
   tuple for a particular session, the NAPT would perform Load
   Sharing avoidance for all HTTP requests from that external
   realm host for the duration of that session and even normal
   HTTP requests to the website from this external realm host
   which might not be part of the HTTP session would be sent to
   the same internal realm host. The length of the session
   would be the time for which the session ID tuple entry would
   be present in the HTTP session id table. This operation in no
   way affects the normal processing of internal realm references
   and subsequent port translation in HTML documents for which
   the NAPT would maintain a separate entry for load sharing
   avoidance.

2.b) In case the HTTP session is as a result of translation of an
   internal realm URL, this would be in cases when the HTTP
   session based application isn't a shared application and is
   present on only one particular internal realm webserver. The
   HTTP session id tuple would contain an entry of the form
   SA (external realm source), DA (NAPT IP address), DP (NAPT port
   from PLS range for load sharing avoidance), internal DA (internal
   realm host address), internal DP (internal realm port), HTTP
   Session ID. In this case the NAPT would be able to load share
   a normal HTTP request from the same external realm source to any
   internal realm webserver since the incoming tuple for that request
   would have DP ( say 80), the default port for this website which
   wouldn't match the HTTP session ID tuple. Since conventionally
   HTTP session based application aren't shared ( like a
   payment gateway on a ecommerce site), the overhead of load sharing avoidance for normal HTTP requests from the external realm HTTP session endpoint wouldn't be a problem.

3) Based on the reponse from the client the ALG component on the internal host might a) Send a SESSION ID release PDU to the LS T-NAPT consisting of HTTP SESSION ID, SA, SP, DA, DP. This means that the session has been invalidated by the client. This also implicitly states that the ALG component on the internal host maintains a table of these internally.

OR b) keep the SESSION ID tuple intact by not sending the SESSION ID release PDU. This means the session request has been accepted.

4.6.3 Detecting End of Session

Tuple entries on the webserver would be invalidated by two mechanisms.

1) Appropriate timers will be maintained on the web server to time out tuple entries.

2) If the ALG on the webserver detects more than a configured number of normal HTTP requests (not part of any session) from an external realm HTTP session endpoint, the tuple entry for that HTTP session would be invalidated.

On invalidation of a tuple entry a Session ID Release PDU would be sent to the LS T-NAPT ALG component. On receiving the Session ID Release PDU, the LS T-NAPT ALG component would by removing the tuple entry from its table.

The components of a Session ID release PDU would be the same as in the Session ID Grab PDU. The value in the type field in the Session ID release PDU would be different from that of the Session ID grab PDU to distinguish between the two PDUs.

4.7 Application requirements 4.7.1 ALG component on the LS T-NAPT

The ALG component on the LS T-NAPT and the ALG component on the internal realm host may be listening on a well known port which can be designated as per requirements from the IETF.

A convenient port number available for such usage would fulfill the requirements. The ALG component would listen in on this port and actively reply to any requests for port request, port status, port
release as per the requirements specified.

4.7.2 ALG component on the web server.
(TBD)

4.7.2.1 Parsing the References to internal realm addresses/names

Basically the need is to have a parser that looks at the HTML pages
requested from the external realm and watch out for occurrences of
internal realm hosts and internally resolvable fully qualified
domain names. This parser can be configured on the ALG component
on the web server via a configuration file. Once the parsing and
translation spelt out in the earlier section is done, such a
translated output stream can be sent to the section of the
web server that replies to such requests. Hence this would require
a modification in the way the requests are handled on the web
server. This is a matter for further enquiry.

4.8 Heuristics for.....

- Detecting start of connection
    * TCP SYN means the start of the connection. There shouldnt
    be an ACK with the SYN else it is a reply for an outgoing
    SYN (request for connection).
- Detecting end of connection
    * TCP FIN means the end of the connection.

4.9 Security issues

As mentioned in RFC 2663 [1]....

"IPsec techniques which are intended to preserve the Endpoint
addresses of an IP packet will not work with NAT enroute for most
applications in practice. Techniques such as AH and ESP protect the
contents of the IP headers (including the source and destination
addresses) from modification. Yet, NAT's fundamental role is to alter
the addresses in the IP header of a packet.". As a result of this
HTTP ALG as described in this draft will not work in such an
environment.

Typical implementations of IPsec terminate at the edges of the
enterprise. This means that when the IP data reaches the LS T-NAPT
it would be in the decrypted form. If the LS T-NAPT and the edge
of the enterprise are one and the same, then the decryption would
take place first before the NAT functionality takes over.

5. References: The teaching and contents of the following references are hereby incorporated by reference in their entirety:

[1] Srisuresh .P, Holdrege .M, "IP Network Address Translator (NAT) Terminology and Considerations." , RFC 2663, August 1999.

[2] Reynolds, J. and J. Postel, "Assigned Numbers", STD 2, RFC 1700, October, 1994.

[3] Rekhter, Y., Moskowitz, B., Karrenberg, D., de Groot,G. and E. Lear, "Address Allocation for Private Internets", BCP 5, RFC 1918, February 1996.

End of APPENDIX A.

What is claimed is:

1. A method by which an application level gateway reference translator in a first network modifies an application data structure for sending to a computer system in a second network, the second network coupled to the first network by a gateway computer system, the application data structure comprising a local reference to a computer system in the first network, the local reference being local to the first network, the method comprising:

determining whether a mapping entry for the local reference has been established in a reference translation data structure of the application level gateway reference translator;

if the mapping entry has not been established, then invoking a computer system identifier negotiation protocol at the application level gateway reference translator to request a computer system identifier from the gateway computer system, the computer system identifier being associated with the local reference in the gateway computer system, and upon receiving the computer system identifier at the application level gateway reference translator from the gateway computer system, storing the computer system identifier in association with the local reference to create the mapping entry in the reference translation data structure of the application level gateway reference translator;

obtaining the computer system identifier from the mapping entry based on the local reference from the application data structure, the application data structure comprising a first web site construct served by a web server computer system in the first network, the local reference comprising a portion of a uniform resource locator (URL), wherein the URL is included in the web site construct and identifies the computer system in the first network that serves a portion of data identified by the uniform resource locator;

replacing the local reference in the application data structure with a translated reference to create a modified application data structure, the translated reference including the computer system identifier and an external address of the gateway computer system, the external address being accessible from the second network, the modified application data structure comprising a second web site construct; and sending the modified application data structure to the computer system in the second network.

2. The method of claim 1 wherein
   the computer system identifier is a port reference within an interface having the external address of the gateway computer system that is mapped to the computer system on the first network specified in the local reference.

3. The method of claim 2 further including the step of receiving, at the web server computer system, a request for the web site construct, and wherein the steps of determining and replacing are performed within the web server computer system in response to the web server receiving the request for the web site construct, such that the local reference to the computer system on the first network is translated into a network address of the gateway computer system and a port reference in the gateway computer system that is mapped to the computer system on the first network specified in the local reference.

4. The method of claim 1 wherein:
   in the application data structure, the local reference to the computer system on the first network includes a hostname of the computer system on the first network;

the method further includes the step of resolving the hostname of the computer system on the first network into a network address of the computer system on the first network; and the computer system identifier is a port reference within the gateway computer system that matches the network address of the computer system on the first network identified by the hostname.

5. The method of claim 1 wherein the computer system identifier negotiation protocol is a port negotiation protocol that dynamically creates, in an entry in the reference translation data structure, a one-to-one mapping between a protocol port on the gateway computer system and a computer system network address of the computer system on the first network specified in the local reference.

6. The method of claim 1, wherein:
   the computer system identifier is a port reference on the gateway computer system mapped to the computer system on the first network specified in the local reference;

the external address of the gateway computer system is an advertised network address of the gateway computer system and is resolvable on both the first and second networks; and the step of replacing creates a translated reference that contains the advertised network address of the gateway computer system and the port reference on the gateway computer system that is mapped to the computer system on the first network specified in the local reference.

7. The method of operating a gateway computer system to enable a first computer system in a first network to be accessed from a second computer system in a second network, the method comprising:

establishing a mapping entry in a reference translation data structure in the gateway computer system, the mapping entry mapping a local reference to a computer system identifier, the local reference identifying the first computer system within the first network, the computer system identifier identifying the first computer system within the gateway computer system;

receiving a first message from the first network, the first message including a web page, the web page including a universal resource locator (URL) comprising the local reference;

creating a first modified message by replacing the local reference in the web page with both an identifier of the gateway computer system and the computer system identifier from the mapping entry;

forwarding the first modified message to the second network; and upon receiving a second message from the second network, the second message including the computer system identifier and the identifier of the gateway computer system as message destination identifiers:

obtaining the local reference from the mapping entry of the reference translation data structure based on the computer system identifier in the second message;

creating a second modified message by replacing the identifier of the gateway computer system and the computer system identifier with the local reference from the mapping entry; and forwarding the second modified message to the first network.

8. The method of claim 7 wherein establishing the mapping entry in the reference translation data structure comprises:
   selecting a port reference to a protocol port of an advertised network interface in the gateway computer system; and entering the port reference as the computer system identifier in the mapping entry in the reference translation data structure corresponding to the first computer system.

9. The method of claim 8 wherein selecting the port reference comprises selecting a protocol port from a predefined range of ports assigned to computer systems on the first network.

10. A first computer system comprising:

a processor;

a network interface;

a memory system encoded with logic instructions and data including an application level gateway reference translator process and a reference translation data structure; and an interconnection mechanism coupling the processor, the network interface, and the memory system;

wherein, when the application level gateway reference translator process is performed on the processor, the processor performs a method for modification of an application data structure for sending to a second computer system in a second network, the second network coupled to a first network by a gateway computer system, the first computer system in the first network, the application data structure comprising a local reference to the first computer system in the first network, the local reference being local to the first network, the method including the steps of:

determining whether a mapping entry for the local reference has been established in a reference translation data structure of the application level gateway reference translator process;

if such a mapping entry has not been established, then invoking a computer system identifier negotiation protocol to request a computer system identifier from the gateway computer system, the computer system identifier being associated with the local reference within the gateway computer system, and upon receiving the computer system identifier from the gateway computer system, storing the computer system identifier in association with the local reference to create the mapping entry in the reference translation data structure of the application level gateway reference translator;

obtaining the computer system identifier from the mapping entry based on the local reference from the application data structure, the application data structure comprising a first web site construct, the local reference comprising a portion of a uniform resource locator (URL), wherein the URL is included in the web site construct and identifies the first computer system that serves a portion of data identified by the uniform resource locator;

replacing the local reference in the application data structure with a translated reference to create a modified application data structure, the translated reference including the computer system identifier and an external address of the gateway computer system, the external address being accessible from the second network, the modified application data structure comprising a second web site construct; and sending the modified application data structure to the second computer system in the second network.

11. The first computer system of claim 10 wherein the computer system identifier is a port reference within an interface having the external address of the gateway computer system that is mapped to the first computer system on the first network specified in the local reference.

12. The first computer system of claim 11 wherein the method performed by the processor further includes receiving, at the first computer system, a request for the web site construct, and wherein the steps of determining and replacing are performed within the first computer system in response to the web server receiving the request for the web site construct, such that the local reference is translated into a network address of the gateway computer system and a port reference in the gateway computer system that is mapped to the first computer system.

13. The first computer system of claim 10 wherein:

in the application data structure, the local reference to the first computer system includes a hostname of the first computer system reachable on the first network;

the method further includes the step of resolving the hostname of the first computer system into a network address of the first computer system on the first network; and the computer system identifier is a port reference within the gateway computer system that matches the network address of the first computer system.

14. The first computer system of claim 10 wherein the computer system identifier negotiation protocol is a port negotiation protocol that dynamically creates, in an entry in the reference translation data structure, a one-to-one mapping between a protocol port on the gateway computer system and a computer system network address of the first computer system.

15. The first computer system of claim 10, wherein:

the computer system identifier is a port reference on the gateway computer system mapped to the first computer system;

the local reference to the gateway computer system is an advertised network address of the gateway computer system and is resolvable on both the first and second networks; and the step of replacing creates a translated reference that contains the advertised network address of the gateway computer system and the port reference on the gateway computer system that is mapped to the first computer system.

16. A gateway computer system comprising:

a processor;

a memory system encoded with logic instructions and data including an application level gateway reference translator process and a reference translation data structure;

an interconnection mechanism coupling the processor and the memory system;

wherein, when the application level gateway reference translator process is performed on the processor, the processor performs a method enabling a first computer system in a first network to be accessed from a second computer system in a second network, the method comprising:

establishing a mapping entry in a reference translation data structure in the gateway computer system, the mapping entry mapping a local reference to a computer system identifier, the local reference identifying the first computer system within the first network, the computer system identifier identifying the computer system within the second network;

receiving a first message from the first network, the first message including at least one packet header and an application data structure, the application data structure including the local reference as a message source identifier;

creating a first modified message by replacing the local reference in the application data structure with an identifier of the gateway computer system and the computer system identifier from the mapping entry;

forwarding the first modified message to the second network; and in response to receiving a second message from the second network, the second message including the computer system identifier and the identifier of the gateway computer system as message destination identifiers;

obtaining the local reference from the mapping entry of the reference translation data structure based on the computer system identifier;

creating a second modified message by replacing the identifier of the gateway computer system and the computer system identifier with the local reference from the mapping entry; and forwarding the second modified message to the first network.

17. The gateway computer system of claim 16 wherein the establishing step performed by the processor includes the steps of:

selecting a port reference to a protocol port of an advertised network interface in the gateway computer system; and entering the port reference as the computer system identifier in the mapping entry in the reference translation data structure corresponding to the first computer system specified in the local reference.

18. The gateway computer system of claim 17 wherein the port reference selecting step performed by the processor selects a protocol port from a predefined range of ports which are assigned to computer systems on the first network.

19. A first computer system comprising:

a processor;

a network interface;

a memory system encoded with logic instructions and data including an application level gateway reference translator process and a reference translation data structure by which a web page is modified for sending to a second computer system in a second network coupled to a first network by a gateway computer system, the web page comprising a local reference to the first computer system in the first network;

an interconnection mechanism coupling the processor, the network interface, and the memory system; wherein the logic instructions are executable by the processor to:

determine whether a mapping entry for the local reference has been established in a reference translation data structure of the application level gateway reference translator process;

in response to a determination the mapping entry has not been established, request, based on a computer system identifier negotiation protocol, a computer system identifier from the gateway computer system, the computer system identifier being associated with the local reference within the gateway computer system, and in response to receipt of the computer system identifier from the gateway computer system, store the computer system identifier in association with the local reference to create the mapping entry in the reference translation data structure;

replace the local reference in the web page with a translated reference to create a modified web page, the translated reference including the computer system identifier and an external address of the gateway computer system, the external address being accessible from the second network; and sending the modified web page to the second computer system in the second network.

20. A gateway computer system to enable a first computer system in a first network to be accessed from a second computer system in a second network, the gateway computer system comprising:

a processor;

a memory system encoded with logic instructions executable with the processor; and an interconnection mechanism coupling the processor and the memory system, wherein the logic instructions, when executed with the processor, are executable to:

establish a mapping entry in a reference translation data structure in the gateway computer system, the mapping entry mapping a local reference to a computer system identifier, the local reference identifying the first computer system within the first network, and the computer system identifier identifying the first computer system within the gateway computer system;

transmit the computer system identifier from the mapping entry to an application level gateway reference translator process in the first network in response to receipt of a request from the application level gateway reference translator process in connection with modification of a web page comprising the local reference;

receive a modified web page formed by replacing the local reference in the web page with the computer system identifier;

transmit the modified web page to the second network;

receive a message from the second network, the message including the computer system identifier and an identifier of the gateway computer system as message destination identifiers;

obtain the local reference from the mapping entry based on the computer system identifier in the message;

create a modified message by replacing the identifier of the gateway computer system and the computer system identifier with the local reference from the mapping entry; and forward the modified message to the first network.

21. A computer program product having a computer-readable medium including computer program logic encoded thereon by which an application level gateway reference translator process in a first network modifies an application data structure for sending to a computer system in a second network, the second network coupled to the first network by a gateway computer system, the application data structure comprising a local reference to a computer system in the first network, such that the computer program logic, when executed on at least one processing unit with a computer system, causes the at least one processing unit to perform the steps of:

determining whether a mapping entry for the local reference has been established in a reference translation data structure of the application level gateway reference translator process;

if the mapping entry has not been established, then invoking a computer system identifier negotiation protocol at the application level gateway reference translator process to request a computer system identifier from the gateway computer system, the computer system identifier being associated with the local reference within the gateway computer system, and upon receiving the computer system identifier at the application level gateway reference translator process from the gateway computer system, storing the computer system identifier in association with the local reference to create the mapping entry in the reference translation data structure;

obtaining the computer system identifier from the mapping entry based on the local reference from the application data structure, the application data structure comprising a first web site construct served by a web server computer system in the first network, the local reference comprising a portion of a uniform resource locator (URL), wherein the URL is included in the web site construct and identifies the computer system in the first network that serves a portion of data identified by the uniform resource locator;

replacing the local reference in the application data structure with a translated reference to create a modified application data structure, the translated reference including the computer system identifier and an external address of the gateway computer system, the external address being accessible from the second network, the modified application data structure comprising a second web site construct; and sending the modified application data structure to the computer system in the second network.

22. A computer program product having a computer-readable medium including computer program logic encoded thereon by which a gateway computer system enables a first computer system in a first network to be accessed from a second computer system in a second network, such that the computer program logic, when executed by at least one processor, causes the at least one processor to perform the steps of:

establishing a mapping entry in a reference translation data structure in the gateway computer system, the mapping entry mapping a local reference to a computer system identifier, the local reference identifying the first computer system within the first network, the computer system identifier identifying the first computer system within the gateway computer system;

upon request of an application level gateway reference translator process in the first network in connection with modification of an application data structure for sending to the second computer system, providing the application level gateway reference translator process with the computer system identifier from the mapping entry;

receiving a modified application data structure in a payload of a packet, the modified application data structure comprising the application data structure modified to include the computer system identifier instead of the local reference;

forwarding the application data structure to the second computer;

receiving a message from the second network, the message including a message destination identifier comprising the computer system identifier and an identifier of the gateway computer system;

obtaining the local reference from the mapping entry of the reference translation data structure based on the computer system identifier;

creating a modified message by replacing the identifier of the gateway computer system and the computer system identifier with the local reference from the mapping entry; and forwarding the modified message to the first computer system.

23. A method of operating a server computer on a local network coupled to a wide-area network by a gateway computer, comprising:

monitoring contents of web pages being served by the server computer to client computers on the wide-area network to detect resource locators including local references identifying other server computers on the local network, the local references being in the contents of web pages and not identifying the other server computers from within the wide-area network;

detecting, in a web page requested by a client computer on the wide-area network, a local reference to another server computer on the local network, the local reference comprising a portion of a uniform resource locator (URL), wherein the URL is included in the web page and identifies the another server computer on the local network that serves a portion of data identified by the URL;

replacing the local reference with a translated reference including first and second identifiers, the first identifier identifying the gateway computer on the wide-area network, the second identifier being mapped to the local reference within the gateway computer; and serving the web page modified to include the translated reference to the client computer.

24. A method according to claim 23, wherein the second identifier is a port reference within an interface that is mapped to the other server computer on the local network.

25. A method according to claim 23, wherein:

the local reference includes a hostname of the other server computer on the local network;

the method further comprising resolving the hostname of the other server computer on the local network into a network address of the other server computer on the local network; and the second identifier is a port reference within the gateway computer system that is mapped to the network address of the other server computer on the local network.

26. The method of claim 23, wherein:

the second identifier is a port reference on the gateway computer system mapped to the other server computer system on the local network;

the first identifier is an advertised network address of the gateway computer resolvable on both the local and wide-area networks; and replacing the local reference with the translated reference comprises creating a translated reference that contains the advertised network address of the gateway computer and the port reference on the gateway computer system that is mapped to the other server computer on the local network.

27. A server computer, comprising:

a processor;

a network interface;

a memory system encoded with logic instructions and data including an application level gateway reference translator process; and an interconnection mechanism coupling the processor, the network interface, and the memory system;

wherein, when the application level gateway reference translator process is performed on the processor, the processor performs a method including the steps of:

monitoring contents of web pages being served by the server computer to client computers on a wide-area network to detect resource locators including local references, the resource locators being in the contents of the web pages, the local references identifying other server computers on a local network, the local references not identifying the other server computers from within the wide-area network;

detecting, in a web page requested by a client computer on the wide-area network, a local reference to one of the other server computers on the local network;

replacing the local reference with a translated reference including first and second identifiers, the first identifier identifying the gateway computer on the wide-area network, the second identifier being mapped to the local reference within the gateway computer; and serving the web page modified to include the translated reference to the client computer.

28. A server computer according to claim 27, wherein:

the local reference is a portion of a uniform resource locator contained within the web page, and the other server computer can serve a portion of data identified by the uniform resource locator; and the second identifier is a port reference within an interface that is mapped to the one of the other server computers on the local network.

29. A server computer according to claim 27, wherein:

the local reference includes a hostname of the one of the other server computers on the local network; the method performed by the processor further comprising resolving the hostname of the other server computer on the local network into a network address of the one of the other server computers on the local network; and the second identifier is a port reference within the gateway computer system that is mapped to the network address of the one of the other server computers on the local network.

30. The server computer of claim 27, wherein:

the second identifier is a port reference on the gateway computer system mapped to the one of the other server computers on the local network;

the first identifier is an advertised network address of the gateway computer resolvable on both the local and wide-area networks; and replacing the local reference with the translated reference comprises creating a translated reference that contains the advertised network address of the gateway computer and the port reference on the gateway computer system that is mapped to the one of the other server computers on the local network.

* * * * *

UNITED STATES PATENT AND TRADEMARK OFFICE
CERTIFICATE OF CORRECTION

| | | |
|---|---|---|
| PATENT NO. | : 7,788,407 B1 | Page 1 of 1 |
| APPLICATION NO. | : 10/914444 | |
| DATED | : August 31, 2010 | |
| INVENTOR(S) | : Balaji Venkat et al. | |

It is certified that error appears in the above-identified patent and that said Letters Patent is hereby corrected as shown below:

Title page, insert

--Related U.S. Application Data

(62) Continuation of application No. 09/693,732, filed on October 21, 2000.--.

Signed and Sealed this

Sixteenth Day of November, 2010

David J. Kappos
*Director of the United States Patent and Trademark Office*